United States Patent [19]
Okuno et al.

[11] Patent Number: 5,812,896
[45] Date of Patent: Sep. 22, 1998

[54] CAMERA ADAPTED TO USE FILM CARTRIDGE PROVIDED WITH MOVABLE LIGHT-SHIELDING DOOR

[75] Inventors: Ryoji Okuno; Makoto Miyawaki, both of Kanagawa-ken, Japan

[73] Assignee: Canon Kabushiki Kaisha, Tokyo, Japan

[21] Appl. No.: 363,887

[22] Filed: Dec. 23, 1994

[30] Foreign Application Priority Data

Dec. 27, 1993 [JP] Japan ................................. 5-347175

[51] Int. Cl.⁶ ............................ G03B 17/02; G03B 17/26
[52] U.S. Cl. .......................... 396/513; 396/303; 396/538
[58] Field of Search ........................ 354/484, 21, 173.1, 354/275, 288; 352/74; 396/512, 513, 514, 515, 516, 535, 536, 538, 301, 302, 303

[56] References Cited

U.S. PATENT DOCUMENTS

| | | | |
|---|---|---|---|
| 4,845,733 | 7/1989 | Dieterlen et al. | 378/177 |
| 4,938,429 | 7/1990 | Robertson et al. | 242/71.1 |
| 4,982,211 | 1/1991 | Suzuki | 354/173.1 |
| 5,049,914 | 9/1991 | Dassero | 354/288 |
| 5,159,365 | 10/1992 | Takahashi et al. | 354/21 |
| 5,210,568 | 5/1993 | Miyake et al. | 396/303 |
| 5,521,661 | 5/1996 | Wakabayashi | 396/538 |

FOREIGN PATENT DOCUMENTS 0430262  6/1991  European Pat. Off. .

OTHER PUBLICATIONS

Patent Abstracts of Japan No. JP5027314, vol. 17, No. 305.
Patent Abstracts of Japan No. JP57132133, vol. 6, No. 229.

*Primary Examiner*—A. A. Mathews
*Attorney, Agent, or Firm*—Robin, Blecker & Daley

[57] ABSTRACT

A camera or an apparatus adapted to use an image recording medium cartridge having an image-recording-medium entrance-exit cover, or a unit which is applicable to such camera or apparatus, includes a first circuit for performing an operation for at least one of loading and unloading of the image recording medium cartridge into and from the camera or the apparatus, and a second circuit for inhibiting an operation different from the operation for at least one of loading and unloading the image recording medium cartridge into and from the camera or the apparatus from being performed simultaneously with the operation of the first circuit, the second circuit being adapted to use an energy source provided for driving the first circuit.

29 Claims, 13 Drawing Sheets

CAMERA ADAPTED TO USE FILM CARTRIDGE PROVIDED WITH MOVABLE LIGHT-SHIELDING DOOR

BACKGROUND OF THE INVENTION

1. Field of the Invention

The present invention relates to an improvement in a camera adapted to use a film cartridge provided with a movable light-shielding door.

2. Description of the Related Art

Conventionally, a film cartridge is loaded into a camera, typically by the method shown in FIG. 14. In this method, a back lid 52 is opened at the back of the camera, and a cartridge 57 is loaded into a cartridge chamber 18 which appears in the open area of the camera. This method has, however, a number of problems. Since the open area uncovers various internal mechanisms of the camera, a user unfamiliar with cameras may become uneasy. In addition, since individual cameras adopt subtly different cartridge loading methods, users are forced to perform complicated loading operations. If a user is to load a cartridge into a camera, the user will need to shift the cartridge or the camera from one hand to the other over and over again. This often leads to a failure in cartridge loading or causes the user to perform an awkward operation for cartridge loading.

SUMMARY OF THE INVENTION

It is, therefore, one object of the present invention to provide an arrangement capable of appropriately performing at least one of loading and unloading of an image recording medium cartridge into and from a camera or the like.

To achieve the above object, in accordance with one aspect of the present invention, there is provided a camera or an apparatus adapted to use the image recording medium cartridge having an image-recording-medium entrance-exit cover, or a unit which is applicable to such camera or apparatus. Such camera, apparatus or unit includes first means for performing an operation for at least one of loading and unloading of the image recording medium cartridge into and from the camera or the apparatus, and second means for inhibiting an operation different from the operation for at least one of loading and unloading the image recording medium cartridge into and from the camera or the apparatus from being performed simultaneously with the operation of the first means, the second means being adapted to use an energy source provided for driving the first means.

The above and other objects and aspects of the present invention will become apparent from the following detailed description of preferred embodiments of the present invention, taken in conjunction with the accompanying drawings.

DETAILED DESCRIPTION OF THE PREFERRED EMBODIMENTS

Preferred embodiments of the present invention will be described below in detail with reference to the accompanying drawings.

Figure 1:
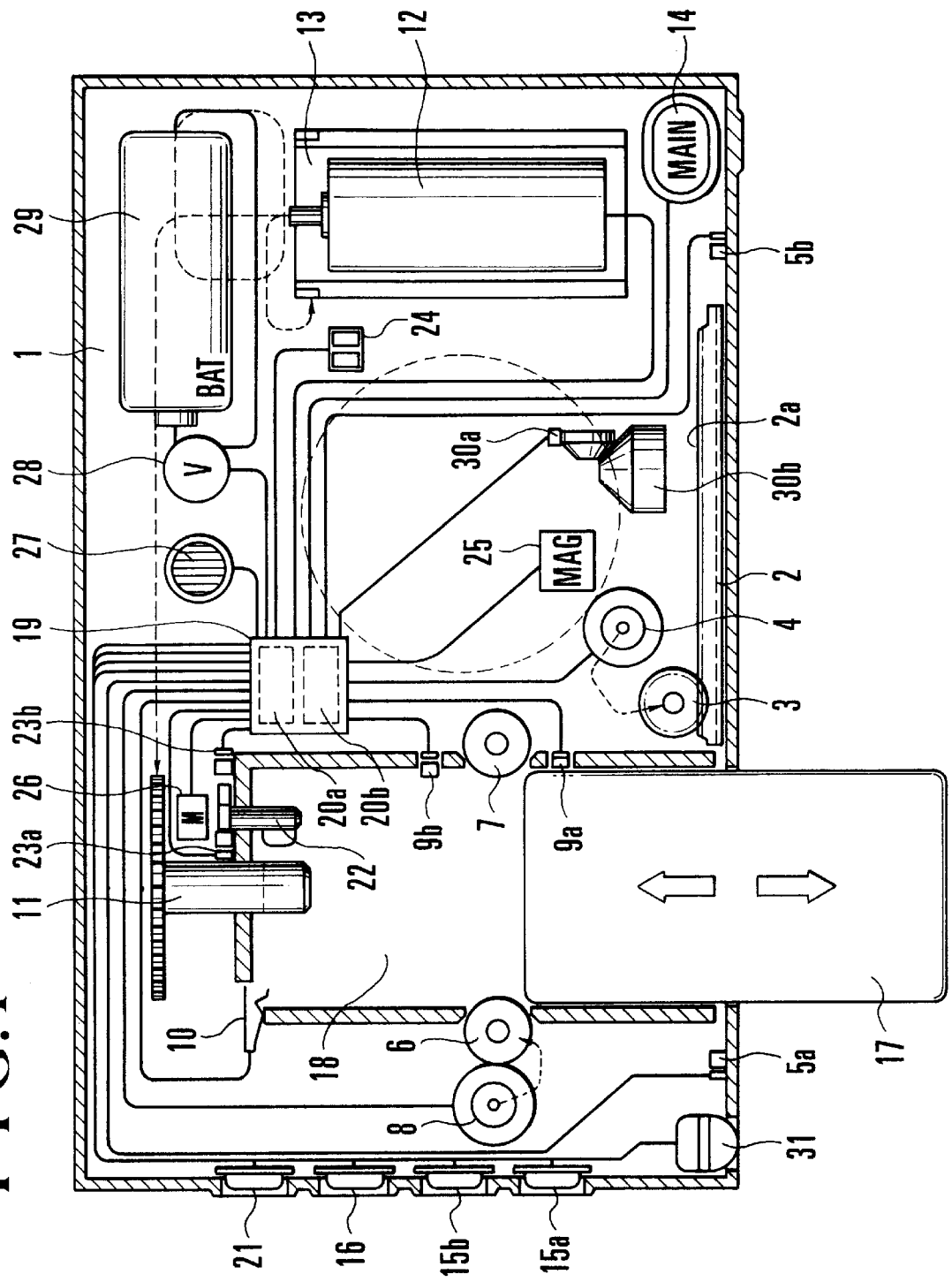
FIG. 1 is a diagrammatic, cross-sectional view of a camera according to a first embodiment of the present invention.

FIG. 1 is a cross-sectional view of a camera according to a first embodiment of the present invention. The camera shown in FIG. 1 includes a camera body 1, a cartridge chamber lid 2 having a rack part 2a and arranged to open or close a cartridge chamber 18, a gear train 3 placed in engagement with the rack part 2a for transmitting power to the cartridge chamber lid 2, a motor 4 for generating the power to be transmitted to the cartridge chamber lid 2, a completion-of-closing-of-cartridge-chamber-lid detecting switch 5a, a completion-of-opening-of-cartridge-chamber-lid detecting switch 5b, a gear 6 having an elastic roller part for conveying a cartridge, a subordinate roller 7 which is rotatably provided for conveying the cartridge, a motor 8 having a gear for transmitting power to the gear 6, a start-of-cartridge-loading detecting switch 9a, a completion-of-cartridge-unloading detecting switch 9b, a completion-of-cartridge-loading detecting switch 10, a fork gear 11 having a fork part which engages with a spool in the cartridge to transport film, and a motor 12 for generating power to be transmitted to a film transporting mechanism of the camera (hereinafter referred to as the film transporting motor 12). The power generated by the film transporting motor 12 is distributed via a gear train (not shown) to the fork gear 11 and a spool gear 13 having a spool part. The shown camera also includes a main switch 14, a cartridge chamber lid opening switch 15a, a cartridge chamber lid closing switch 15b, a forced film rewinding switch 16, the cartridge chamber 18 into which to load a cartridge 17, a microcomputer 19 for controlling the operation of the camera, a time controlling circuit 20a built in the microcomputer 19, an EEPROM (nonvolatile memory) 20b built in the microcomputer 19, a cartridge ejecting switch 21, a driver 22 for opening or closing a door or cover for shielding a film entrance-exit opening from light, the cartridge 17 being provided with the door and the film entrance-exit opening, switches 23a and 23b for respectively detecting the opening and closing positions of the driver 22, film position detecting means 24 for detecting the presence or absence of film by means of a reflector and a photoreflector, a magnetic head 25 for performing magnetic recording to and/or magnetic reading from a photographic film having a magnetic layer, a motor 26 for driving the driver 22, a bell 27 for generating a warning sound, a battery voltage detecting circuit 28 for detecting the supply voltage of a battery 29, the battery 29 which serves as a power source common to all circuits of the camera, a photoreflector 30a for detecting the pulses of a pulse plate formed on a gear train 30b which is rotated in interlocked relation to the movement of the film by surface friction or by engagement with film perforations, and a warning lamp 31.

The cartridge 17 used in the present embodiment is of the type which is disclosed in Japanese Laid-Open Patent Application No. Hei 3-75637, and film having a magnetic layer on or from which to record or read information is, in its initial unexposed state, accommodated in the cartridge 17 in a light-shielded state. If such film is to be drawn from the cartridge 17, it is necessary to drive an operating part, which interlocks with the light-shielding door for shielding the film entrance-exit opening from light, thereby fully opening the light-shielding door. If the cartridge 17 is a cartridge of the conventional type which uses a plush or the like for shielding the film entrance-exit opening from light, there is no need to incorporate the driver 22, the switches 23a and 23b or the motor 26 for driving the driver 22.

The essential operation of the present embodiment will be described below. Referring to FIG. 1, if a user is to open the cartridge chamber lid 2 with the cartridge 17 being not loaded in the cartridge chamber 18, the user presses the cartridge chamber lid opening switch 15a and the output signal of the cartridge chamber lid opening switch 15a is transmitted to the microcomputer 19. The microcomputer 19 performs detection of the supply voltage of the battery 29 via the battery voltage detecting circuit 28. After confirming that the battery 29 has a sufficient predetermined voltage to drive each of the circuits of the camera, the microcomputer 19 supplies electric power from the battery 29 to the motor 4 for driving the cartridge chamber lid 2. The motor 4 drives the cartridge chamber lid 2 via the gear train 3 to cause it to move from its closing position to its opening position. If the microcomputer 19 determines that the battery 29 does not have the aforesaid predetermined voltage, the microcomputer 19 does not accept the output signal from the cartridge chamber lid opening switch 15a. Since the voltage of the battery 29 varies with temperature, it is preferable that the reference value required for the microcomputer 19 to detect the predetermined voltage be prepared as a variable determined by temperature. Subsequently, when the right-hand end (as viewed in FIG. 1) of the cartridge chamber lid 2 which has been driven toward the opening position presses the completion-of-opening-of-cartridge-chamber-lid detecting switch 5b, the output signal of the completion-of-opening-of-cartridge-chamber-lid detecting switch 5b is transmitted to the microcomputer 19 and the microcomputer 19 stops the driving of the motor 4. After that, the microcomputer 19 waits for insertion of the cartridge 17 into the cartridge chamber 18 for a predetermined time period. If no insertion of the cartridge 17 is detected within the predetermined time period, the microcomputer 19 again drives the motor 4 to close the cartridge chamber lid 2. Contrarily, if the cartridge 17 is inserted into the cartridge chamber 18 with the cartridge chamber 18 kept open, the inserted end of the cartridge 17 presses a start-of-cartridge-loading detecting switch 9a and the signal output of the start-of-cartridge-loading detecting switch 9a is transmitted to the microcomputer 19.

Then, the motor 8 for conveying the cartridge 17 (hereinafter referred to as the cartridge conveying motor 8) starts driving for loading the cartridge 17 and the gear (roller) 6 starts rotating. When the cartridge 17 is inserted into the cartridge chamber 18, the cartridge 17 is clamped between the rollers 6 and 7 on its side surface and is inserted into the inside of the camera by the rotational force of the roller 6. When the cartridge 17 is inserted to a further extent, one end of the spool in the cartridge 17 engages with the fork gear 11 and the operating part for operating the light-shielding door for shielding the film entrance-exit opening from light completely engages with the driver 22. When the inserted end face of the cartridge 17 presses the completion-of-cartridge-loading detecting switch 10, the output signal of the completion-of-cartridge-loading detecting switch 10 is transmitted to the microcomputer 19 and the microcomputer 19 stops the driving of the cartridge conveying motor 8. At this time, the cartridge chamber lid 2 is closed automatically or by the cartridge chamber lid closing switch 15b. That is to say, the microcomputer 19 starts to supply electrical power from the battery 29 to the motor 4 so that the motor 4 can rotate in the direction opposite to the direction of the rotation of the motor 4 during the aforesaid operation of opening the cartridge chamber lid 2, and when the cartridge chamber lid 2 presses the completion-of-closing-of-cartridge-chamber-lid detecting switch 5a, the microcomputer 19 stops supplying electrical power from the battery 29 to the motor 4. When the cartridge 17 which has been loaded into the camera is shielded from light in this manner, the microcomputer 19 starts driving for opening the light-shielding door for shielding the film entrance-exit opening from light, so that the driver 22 starts rotating. When the driver 22 presses the switch 23a for detecting the opening position of the driver 22, the microcomputer 19 stops the motor 26.

Then, the microcomputer 19 causes the film transporting motor 12 to start driving for film winding. The film transporting motor 12 rotates the fork gear 11 via a film transporting gear train (not shown), and the fork gear 11 rotates the spool in the cartridge 17 which is engaged with the fork gear 11. Thus, the film is transported in the thrust direction from the film entrance-exit opening of the cartridge 17, passed through the gap between an aperture (not shown) and a pressure plate (not shown), wound around the film transporting motor 12, and transported to a position at which an exposure can be made on the film.

The operation of opening the cartridge chamber lid 2 with the cartridge 17 loaded will be described below. First, when the user presses the cartridge chamber lid opening switch 15a, the output signal of the switch 15a is transmitted to the microcomputer 19. After the completion of film winding, the microcomputer 19 confirms via a detecting switch 23b whether the driver 22 has completely closed the light-shielding door for shielding the film entrance-exit opening of the cartridge 17 from light, i.e., the cartridge 17 is in the state of being shielded from light. After it has been confirmed that the cartridge 17 is in the state of being shielded from light, the microcomputer 19 supplies electric power from the battery 29 to the motor 4 for driving the cartridge chamber lid 2, thereby causing the cartridge chamber lid 2 to move from the closing position to the opening position. When the right-hand end (as viewed in FIG. 1) of the cartridge chamber lid 2 presses the completion-of-opening-of-cartridge-chamber-lid detecting switch 5b, the output signal of the completion-of-opening-of-cartridge-chamber-lid detecting switch 5b is transmitted to the microcomputer 19 and the microcomputer 19 stops the driving of the motor 4. Then, when the cartridge ejecting switch 21 is pressed, the microcomputer 19 starts supplying electric power from the battery 29 to the cartridge conveying motor 8 so that the cartridge conveying motor 8 can rotate in the direction in which the cartridge 17 is to be unloaded. Thus, the cartridge 17 is disengaged from the fork gear 11 and the driver 22, and when the cartridge 17 is conveyed to a position at which the completion-of-cartridge-unloading detecting switch 9b is released from being pressed by the cartridge 17, the output signal of the completion-of-cartridge-unloading detecting switch 9b is transmitted to the microcomputer 19 and the microcomputer 19 stops the supply of electric power to the cartridge conveying motor 8. At this time, since the cartridge 17 is stopped at a position where the inserted portion of the cartridge 17 is clamped between the rollers 6 and 7, the cartridge 17 is prevented from being immediately ejected, owing to the elastic force of the rollers 6 and 7.

The cartridge 17 which is clamped between the (driving) roller 6 and the rotatable, subordinate roller 7 is held by sufficient surface friction and pressure to prevent the cartridge 17 from dropping by its own weight when the cartridge inserting opening of the cartridge chamber 18 is faced down. Accordingly, the user can readily remove the cartridge 17 from the cartridge chamber 18 with his/her own force. When the cartridge 17 is conveyed to its unloading completion position, the microcomputer 19 turns on the warning lamp 31 to inform the user of the completion of unloading of the cartridge 17 and request the user to immediately remove the cartridge 17.

After the completion of unloading of the cartridge 17, if the cartridge 17 is not removed within a predetermined time period, the microcomputer 19 stops the warning of the warning lamp 31, again loads the cartridge 17 and closes the cartridge chamber lid 2. If the cartridge 17 is completely removed from the cartridge chamber 18 within the predetermined time period, the start-of-cartridge-loading detecting switch 9a is made open. When the microcomputer 19 detects that the start-of-cartridge-loading detecting switch 9a is opened, the microcomputer 19 automatically performs driving for closing the cartridge chamber lid 2, or performs such driving after the cartridge chamber lid closing switch 15b has been pressed. When the left-hand end (as viewed in FIG. 1) of the cartridge chamber lid 2 presses the completion-of-closing-of-cartridge-chamber-lid detecting switch 5a, the microcomputer 19 stops the supply of electric power to the motor 4.

Figure 2:
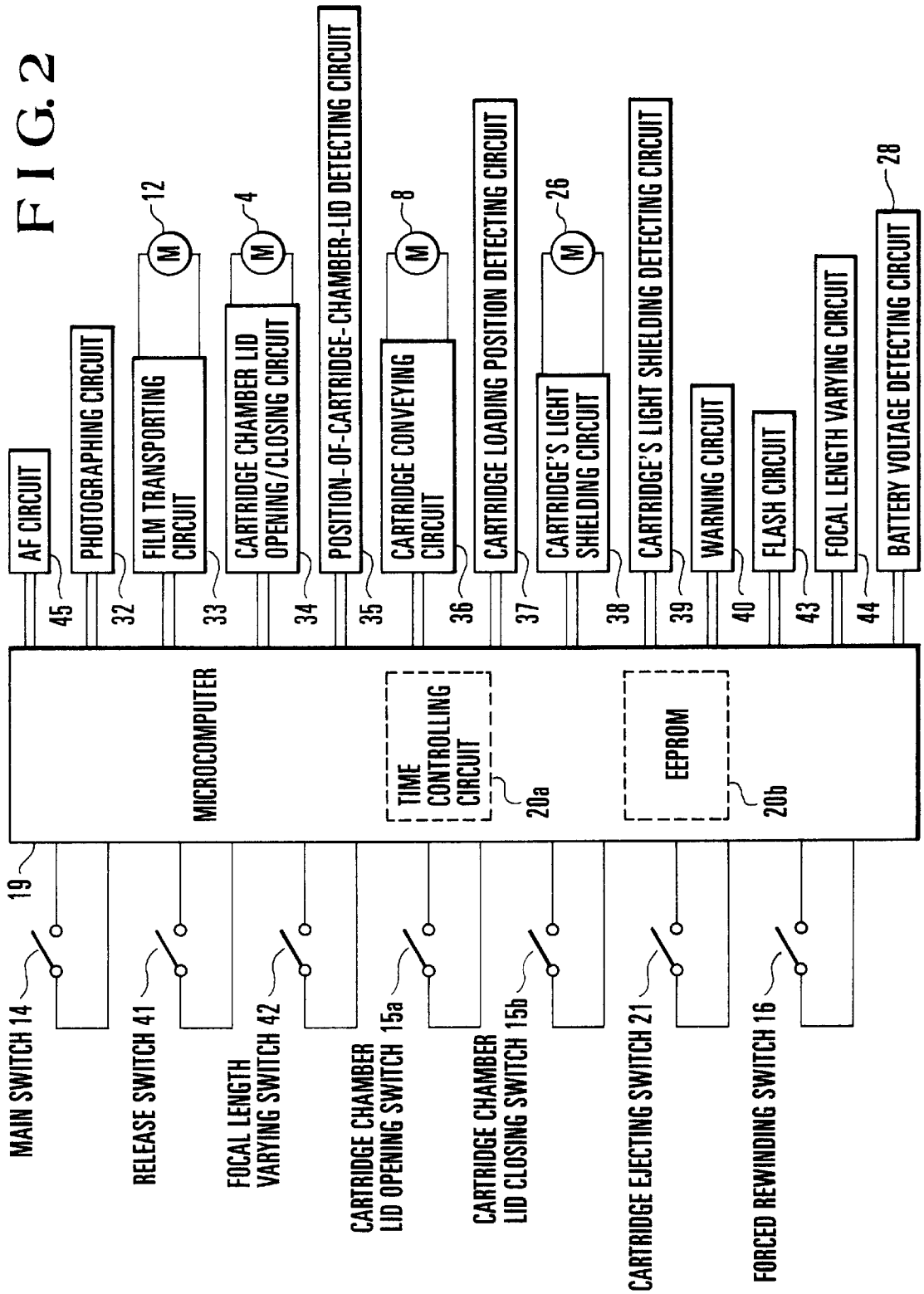
FIG. 2 is a circuit block diagram of the camera of FIG. 1.

FIG. 2 is a circuit block diagram of the camera shown in FIG. 1. The circuit arrangement shown in FIG. 2 includes the aforesaid microcomputer 19 for controlling the camera. The time controlling circuit 20a and the EEPROM 20b capable of at any time rewriting and storing a termination step of a sequence are provided in the microcomputer 19. The shown circuit arrangement also includes the main switch 14, a release switch 41 for executing photography, a focal length varying switch 42 for varying the focal length of a photographic lens, the cartridge chamber lid opening switch 15a, the cartridge chamber lid closing switch 15b, the cartridge ejecting switch 21, the forced film rewinding switch 16, and an automatic distance measuring circuit 45. The automatic distance measuring circuit 45 is not needed in a fixed-focus camera. The shown circuit arrangement also includes a photographing circuit 32 for causing the photographic lens to move forward or backward for the purpose of adjusting focus, as well as for driving an AE (automatic exposure) system, a shutter, a diaphragm and other associated elements, a film transporting circuit 33 for driving the film transporting motor 12 for automatically winding or rewinding film, and a cartridge chamber lid opening/closing circuit 34 for driving the motor 4 for opening or closing the film transporting motor 12. Although the cartridge chamber lid 2 shown in FIG. 1 is of a slide type, various types of lids can be employed.

In the shown circuit arrangement, a position-of-cartridge-chamber-lid detecting circuit 35 includes the aforesaid switches 5a and 5b for detecting whether the cartridge chamber lid 2 has reached the opening completion position or the closing completion position. A cartridge conveying circuit 36 is provided for driving the cartridge conveying motor 8 for loading the cartridge 17 into or unloading it from the camera, as by clamping the cartridge 17 between the rollers 6 and 7. A cartridge loading position detecting circuit 37 includes the switches 9a, 10 and 9b for respectively detecting the insertion of the cartridge 17 into the camera, the completion of loading of the cartridge 17 and the completion of unloading of the cartridge 17. A cartridge's light shielding circuit 38 is provided for driving the motor 26 for opening or closing the light-shielding door for shielding the film entrance-exit opening of the cartridge 17 from light. The cartridge's light shielding circuit 38 is not needed if it is possible to shield the film wound in the cartridge 17 from light, not by means of the light-shielding door but by means of a plush or the like. A cartridge's light shielding detecting circuit 39 includes the detecting switches 23a and 23b for respectively detecting the opening position and the closing position of the light-shielding door of the cartridge 17. If the light-shielding door for shielding the film entrance-exit opening of the cartridge from light is arranged to be closed after the film has been completely rewound in accordance with a film transporting sequence of the camera, it is possible to detect the completion of shielding the cartridge from light and it is also possible to indirectly detect the state of transportation of the film, by detecting the closing position of the light-shielding door of the cartridge by means of the cartridge's light shielding detecting circuit 39. As other methods for directly detecting the state of transportation of the film, it is possible to utilize methods which will be described below.

One method is to detect the presence or absence of film by means of the film position detecting means 24 by utilizing the reflectance of the film as shown in FIG. 1. Another method is intended for film having a magnetic layer and is to detect the presence or absence of the film by reading a signal recorded on the magnetic layer of the film by means of the magnetic head 25. Another method includes the steps of detecting the pulses of the pulse plate provided on the gear train 30b which is driven in interlocked relation to the transportation of the film by the surface friction between the film and rollers or by engagement with the perforations of the film, and storing information about the presence or absence of the film. It is possible to employ any other method capable of detecting whether the required film has been drawn from the cartridge.

A warning circuit 40 includes the bell 27 and the warning lamp 31 for giving the user a warning, as by sound such as a buzzer or a voice, visual display using a liquid-crystal display, or blinking of an LED lamp. The shown circuit arrangement also includes a flash circuit 43 for flash photography, a focal length varying circuit 44 for performing driving for varying the focal length of the photographic lens according to the operation of pressing the focal length varying switch 42, and the battery voltage detecting circuit 28 for directly or indirectly measuring the supply voltage of the battery 29 common to each of the aforesaid circuits.

The main sequence of the camera having the above-described arrangement will be described below with reference to the flowchart shown in FIG. 3 according to which the microcomputer 19 executes the main sequence.

First, if the main switch 14 is turned on, the microcomputer 19 is activated (S101) and starts charging the flash circuit 43 (S102). Then, whether the charging of the flash circuit 43 has been completed is determined by determining whether a charged voltage $E_s$ of the flash circuit 43 has reached a predetermined voltage value $E_2$ (S103). If the charged voltage $E_s$ is greater than the predetermined voltage value $E_2$, the process terminates the charging operation of the flash circuit 43 (S104) and proceeds to Step S105. If the charged voltage $E_s$ has not yet reached the predetermined voltage value $E_2$, the process proceeds to Step S105 while continuing to charge the flash circuit 43. In Step S105, switch status accepting processing is executed to input the status of each of the switches. In Step S106, it is determined whether any of the switches has been pressed. If none of the switches has been pressed, the process returns to Step S102 and repeats the above-described sequence. If any of the switches has been pressed, the process proceeds to Step S107, in which if the flash circuit 43 is being charged, the charging of the flash circuit 43 is stopped. Then, it is determined which of the switches has been pressed. Specifically, in Step S108, it is determined whether the forced film rewinding switch 16 has been pressed, and if the forced film rewinding switch 16 has not been pressed, the process proceeds to Step S110. If the forced film rewinding switch 16 has been pressed, the microcomputer 19 causes the film transporting circuit 33 to drive the film transporting motor 12 in a rewinding direction, thereby performing film rewinding (S109). Then, the process returns to Step S102. In Step S110, it is determined whether the cartridge chamber lid opening switch 15a has been pressed. If the cartridge chamber lid opening switch 15a has not been pressed, the process proceeds to Step S112, whereas, if it has been pressed, the microcomputer 19 executes a cartridge chamber lid opening subroutine which will be described later (S111) and returns the process to Step S102. In Step S112, it is determined whether the cartridge chamber lid closing switch 15b has been pressed, and if it has not been pressed, the process proceeds to Step S114. If it has been pressed, the microcomputer 19 executes a cartridge chamber lid closing subroutine which will be described later (S113) and returns the process to Step S102. In Step S114, it is determined whether the cartridge ejecting switch 21 has been pressed, and if it has been pressed, the process proceeds to Step S116. If it has not been pressed, the microcomputer 19 executes a cartridge unloading subroutine (S115) and returns the process to Step S102. In Step S116, it is determined whether the focal length varying switch 42 has been pressed. If it has not been pressed, the process proceeds to Step S118. If it has been pressed, the microcomputer 19 causes a focal length varying circuit 44 to drive the photographic lens toward a desired focal length position (S117), and returns the process to Step S102. In Step S118, it is determined whether the release switch 41 has been pressed. If it has not been pressed, the process proceeds to Step S120, whereas if it has been pressed, the microcomputer 19 executes, according to the amount by which the release switch 41 has been pressed, a distance measuring operation by means of the automatic distance measuring circuit 45, the succeeding operation of driving the photographic lens forwardly by means of the photographing circuit 32 for the purpose of focus adjustment, the operation of driving the shutter in an opening or closing direction, and a film winding operation by the film transporting circuit 33. Then, the process returns to Step S102. In Step S120, it is determined whether the main switch 14 has been again pressed. If it has not been pressed, the process returns to Step S102, whereas if it has been pressed, the microcomputer 19 changes from the activated state to a standby state (S121), thereby bringing the sequence to an end.

Each of the aforesaid subroutines shown in FIG. 3 will be described below.

Figure 3:
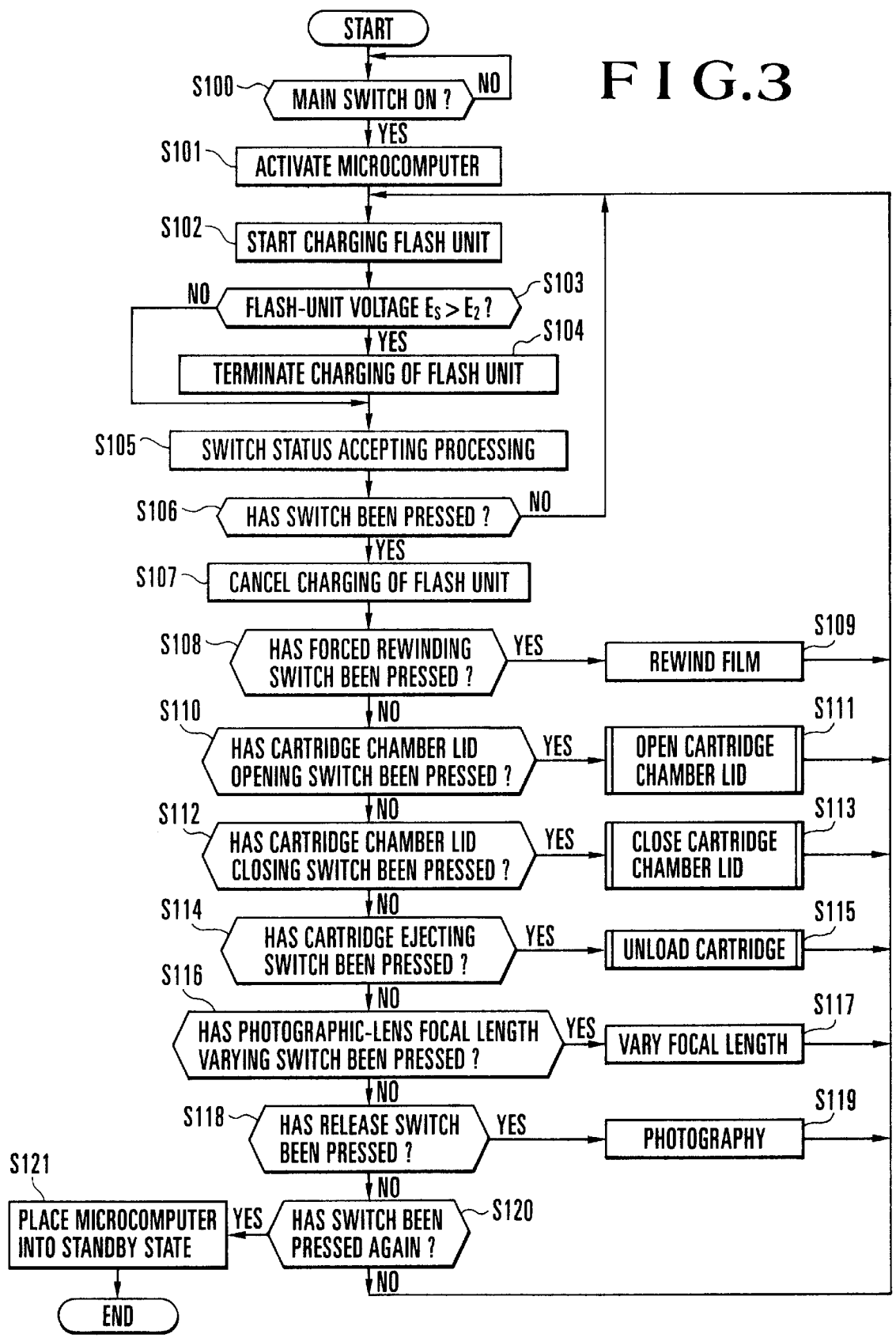
FIG. 3 is a flowchart showing the main sequence of the camera of FIG. 1.
Figure 4:
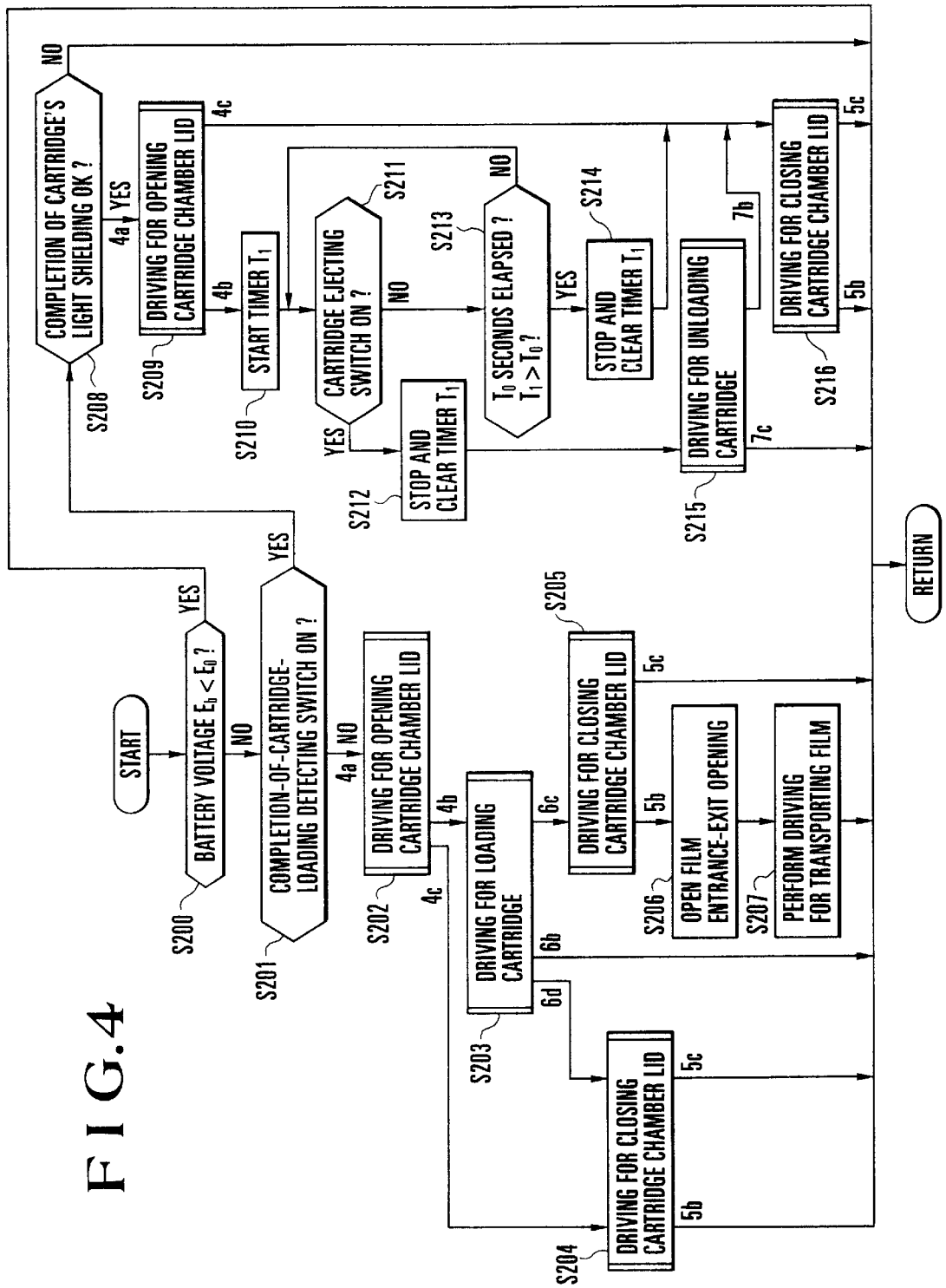
FIG. 4 is a flowchart showing a cartridge chamber lid opening subroutine of the camera of FIG. 1.

FIG. 4 shows the cartridge chamber lid opening subroutine shown in Step S111 of FIG. 3.

First, since it is necessary to prevent the cartridge chamber lid 2 from stopping halfway owing to a decrease in the voltage of the battery 29, it is determined in Step S200 through the battery voltage detecting circuit 28 whether a voltage $E_b$ of the battery 29 is greater than a predetermined voltage $E_0$ which suffices to drive each of the circuits. If the voltage $E_b$ is smaller than the predetermined voltage $E_0$, the process terminates the subroutine and returns to Step S102 of FIG. 3. If the voltage $E_b$ is greater than the predetermined voltage $E_0$, the process proceeds to Step S201, in which, to determine whether the cartridge 17 is present in the camera, it is detected whether the loading of the cartridge 17 has been completed, by means of the completion-of-cartridge-loading detecting switch 10 of the cartridge loading position detecting circuit 37. The process proceeds to either one of two different steps according to whether the cartridge 17 is present or absent.

If the cartridge 17 is absent, the process proceeds to a subroutine (to be described later) for executing driving for opening the cartridge chamber lid 2, thereby starting driving for opening the cartridge chamber lid 2 (S202). Then, if the driving for opening the cartridge chamber lid 2 is completed, the process proceeds along a line 4b, whereas if the cartridge chamber lid 2 stops halfway owing to some trouble during the driving for opening the cartridge chamber lid 2, the process proceeds along a line 4c. If the cartridge chamber lid 2 is made open with the cartridge 17 being absent in the camera, this indicates that the cartridge 17 will be loaded from the outside. Accordingly, if the opening of the cartridge chamber lid 2 is completed (4b), the process immediately proceeds to a cartridge loading driving subroutine which will be described later, and starts driving for loading the cartridge 17 into the cartridge chamber 18 (S203). If the loading of the cartridge 17 is not performed (S203:6d) or the cartridge chamber lid 2 fails to be opened owing to some trouble in Step S202 (S202:4c), the process proceeds to a subroutine for executing driving for closing the cartridge chamber lid 2 (S204) in order to prevent the cartridge chamber lid 2 from remaining open. Thus, the driving for closing the cartridge chamber lid 2 is executed.

If the driving for closing the cartridge chamber lid 2 is completed in Step S204 (S204:5b) or the driving for closing the cartridge chamber lid 2 stops halfway (S204:5c), the microcomputer 19 terminates this subroutine and returns the process to Step S102 of FIG. 3.

If the cartridge 17 is completely loaded in Step S203 (S203:6c), the process proceeds to the subroutine (to be described later) for executing driving for closing the cartridge chamber lid 2 (S205) and the driving for closing the cartridge chamber lid 2 is executed. If the closing of the cartridge chamber lid 2 is completed, the microcomputer 19 causes the cartridge's light shielding circuit 38 to execute driving for opening the light-shielding door for shielding the film entrance-exit opening from light (S206) and causes the film transporting circuit 33 to transport the film in the cartridge 17 to the position at which an exposure can be made on the film (S207). Then, the process returns to Step S102 of FIG. 3. If the cartridge 17 is inserted in Step S203 but stops halfway during loading (S203:6b), or if the driving for closing the cartridge chamber lid 2 stops halfway in Step S205 (S205:5c), the microcomputer 19 terminates this subroutine and returns the process to Step S102 of FIG. 3.

Then, if it is determined in Step S201 that the cartridge 17 is present in the cartridge chamber 18 (S201:YES), the microcomputer 19 detects through the cartridge's light shielding detecting circuit 39 whether the film has been completely rewound in the cartridge 17 by automatic rewinding after the completion of photography for all exposures or by forced rewinding executed through the forced film rewinding switch 16 and the cartridge 17 has been shielded from light by closing the light-shielding door for shielding the film entrance-exit opening from light. If the shielding of the cartridge 17 from light has been completed (S208:YES (as will be described later)), the process proceeds to the subroutine for executing driving for opening the cartridge chamber lid 2 and executes the driving for opening the cartridge chamber lid 2 (S209). However, if the shielding of the cartridge 17 from light has not been completed (208:NO), the film will be exposed to light when the cartridge chamber lid 2 is opened. Accordingly, the operation of opening the cartridge chamber lid 2 is not performed. If the opening of the cartridge chamber lid 2 has been completed in Step S109, the process proceeds along the line 4b, whereas if the opening of the cartridge chamber lid 2 stops halfway, the process proceeds along the line 4c. If the cartridge chamber lid 2 is made open with the cartridge 17 being present in the camera, this indicates that the user is to confirm the state of loading of the cartridge 17 or to replace the cartridge 17 with a new cartridge. Accordingly, a timer $T_1$ provided in the microcomputer 19 is started (S210) and the process waits for $T_0$ seconds until the cartridge ejecting switch 21 is pressed from the outside (S212). If the cartridge ejecting switch 21 is pressed within such $T_0$ seconds (S211:YES), the timer $T_1$ is reset (S212) and the process proceeds to a subroutine (to be described later) for executing driving for unloading the cartridge chamber lid 2 and starts the driving for unloading the cartridge chamber lid 2 from the cartridge chamber 18 (S215). Incidentally, if the opening of the cartridge chamber lid 2 is not completed, the microcomputer 19 does not accept the output signal of the cartridge ejecting switch 21. If the unloading of the cartridge 17 is completed in Step S215 and the cartridge 17 is removed from the cartridge chamber 18, or if the cartridge 17 is again completely loaded into the cartridge chamber 18 (S215:7b) as will be described later, or if the driving for opening the cartridge chamber lid 2 stops halfway in Step S209 (S209:4c), or if the cartridge chamber 18 is made open in Step S209 but the film transporting motor 12 is not pressed within $T_0$ seconds (S213:YES), the process proceeds to Step S216 which will be described later, i.e., the subroutine for executing driving for closing the cartridge chamber lid 2, and starts the driving for closing the cartridge chamber lid 2 in order to prevent the cartridge chamber 18 from remaining open. If the driving for closing the cartridge chamber lid 2 is completed, the process proceeds to Step S316:5b, whereas if such driving stops halfway, the process proceeds to Step S216:5c.

As described above, the cartridge chamber lid 2 is completely closed in Step S207:5b and Step S216:5b, the cartridge chamber lid 2 is open with the cartridge 17 being inserted in Step S203:6b and Step S215:7c, and the cartridge chamber lid 2 is stopped in an incompletely closed position in Step S205:5c and Step S216:5c.

Figure 5:
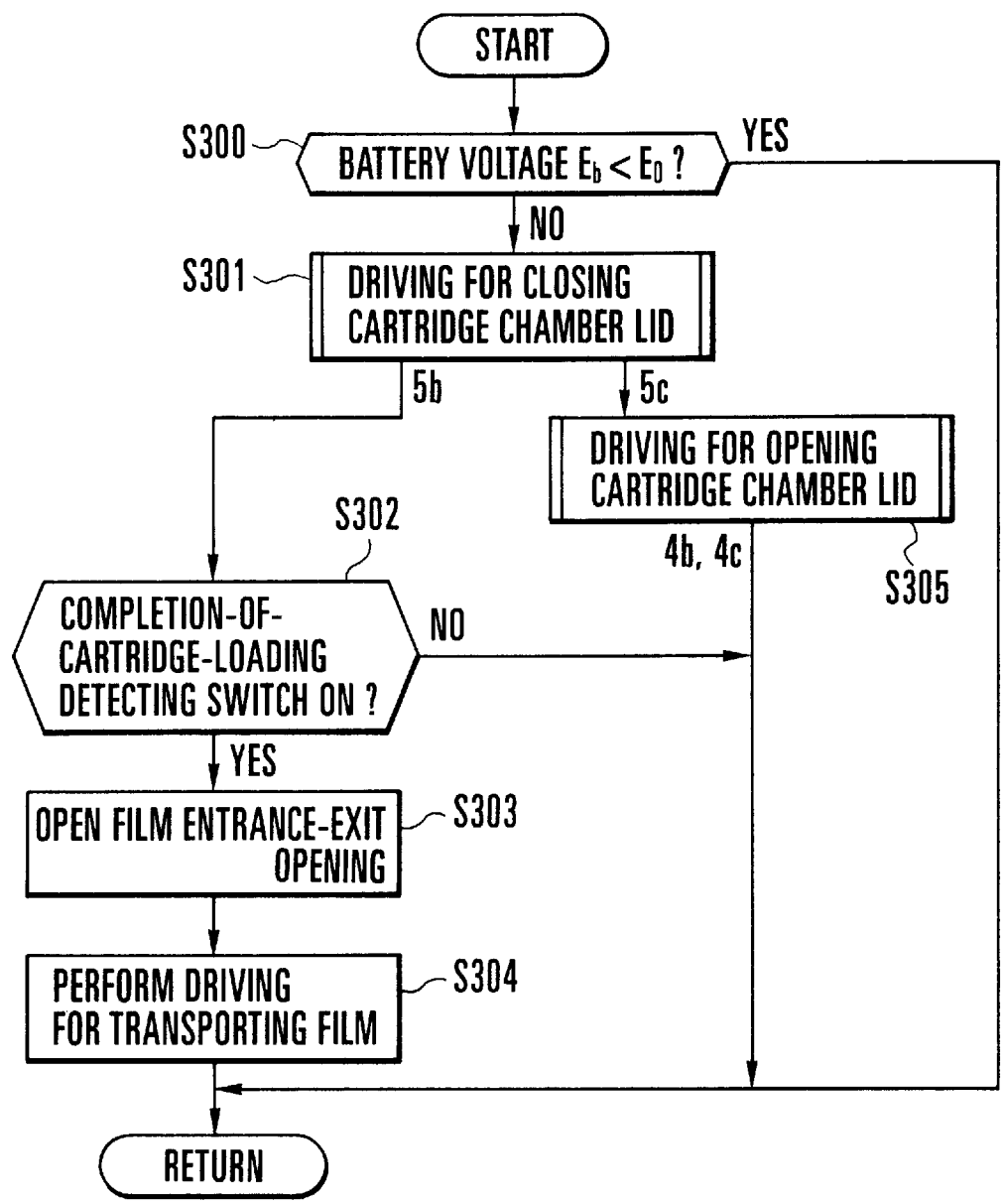
FIG. 5 is a flowchart showing a cartridge chamber lid closing subroutine of the camera of FIG. 1.

By using the cartridge chamber lid opening subroutine shown in FIG. 5, the operation of opening and closing the cartridge chamber 18 can be carried out without the use of the cartridge chamber lid closing switch 15b as long as driving for opening or closing the cartridge chamber lid 2 or driving for conveying the cartridge 17 can be executed without any trouble.

FIG. 5 shows the cartridge chamber lid closing subroutine shown in Step S113 of FIG. 3.

This subroutine is used if the cartridge chamber 18 remains open as a result of a trouble occurring halfway during the cartridge chamber lid opening sequence shown in FIG. 4 or if the cartridge chamber lid 2 is to be forcedly closed halfway during such sequence.

First, since it is necessary to prevent the cartridge chamber lid 2 from stopping halfway owing to a decrease in the voltage of the battery 29, it is determined in Step S300 through the battery voltage detecting circuit 28 whether the voltage $E_b$ of the battery 29 is greater than the predetermined voltage $E_0$ which suffices to drive each of the circuits. If the voltage $E_b$ is smaller than the predetermined voltage $E_0$, the process terminates this subroutine and returns to Step S102 of FIG. 3. If the voltage $E_b$ is greater than the predetermined voltage $E_0$, the process proceeds to the subroutine (to be described later) for executing driving for closing the cartridge chamber lid 2, irrespective of the state of the cartridge chamber lid 2, and starts a subroutine for driving for closing the cartridge chamber lid 2 (S301). If the driving for closing the cartridge chamber lid 2 is completed, the process leaves Step S301 and proceeds along a line 5b, whereas if such driving is not completed, the process leaves Step S301 and proceeds along a line 5c. If the driving for closing the cartridge chamber lid 2 is completed, the microcomputer 19 performs detection by means of the completion-of-cartridge-loading detecting switch 10 of the cartridge loading position detecting circuit 37 in order to confirm whether the cartridge 17 is completely loaded or absent in the camera (S302). If the cartridge 17 is present (S302:YES), the microcomputer 19 causes the cartridge's light shielding circuit 38 to open the light-shielding door for shielding the film entrance-exit opening of the cartridge 17 from light (S303). Then, the microcomputer 19 causes the film transporting circuit 33 to transport the film to the position at which an exposure can be made (S304), and returns the process to Step S102 of FIG. 3.

If the closing of the cartridge chamber lid 2 is completed in Step S301 but the cartridge 17 is absent in the camera (S302:NO), the microcomputer 19 terminates this subroutine and returns the process to Step S102 of FIG. 3. If the cartridge chamber lid 2 is not completely closed in Step S301 (S301:5c), the process proceeds to the subroutine (to be described later) for executing driving for opening the cartridge chamber lid 2 and performs driving for closing the cartridge chamber lid 2 (S305). Then, the process terminates this subroutine irrespective of whether such driving is completed, and returns to Step S102 of FIG. 3.

The above-described subroutines shown in FIGS. 4 and 5 are respectively executed when the cartridge chamber lid opening switch 15a and the cartridge chamber lid closing switch 15b are pressed.

Figure 6:
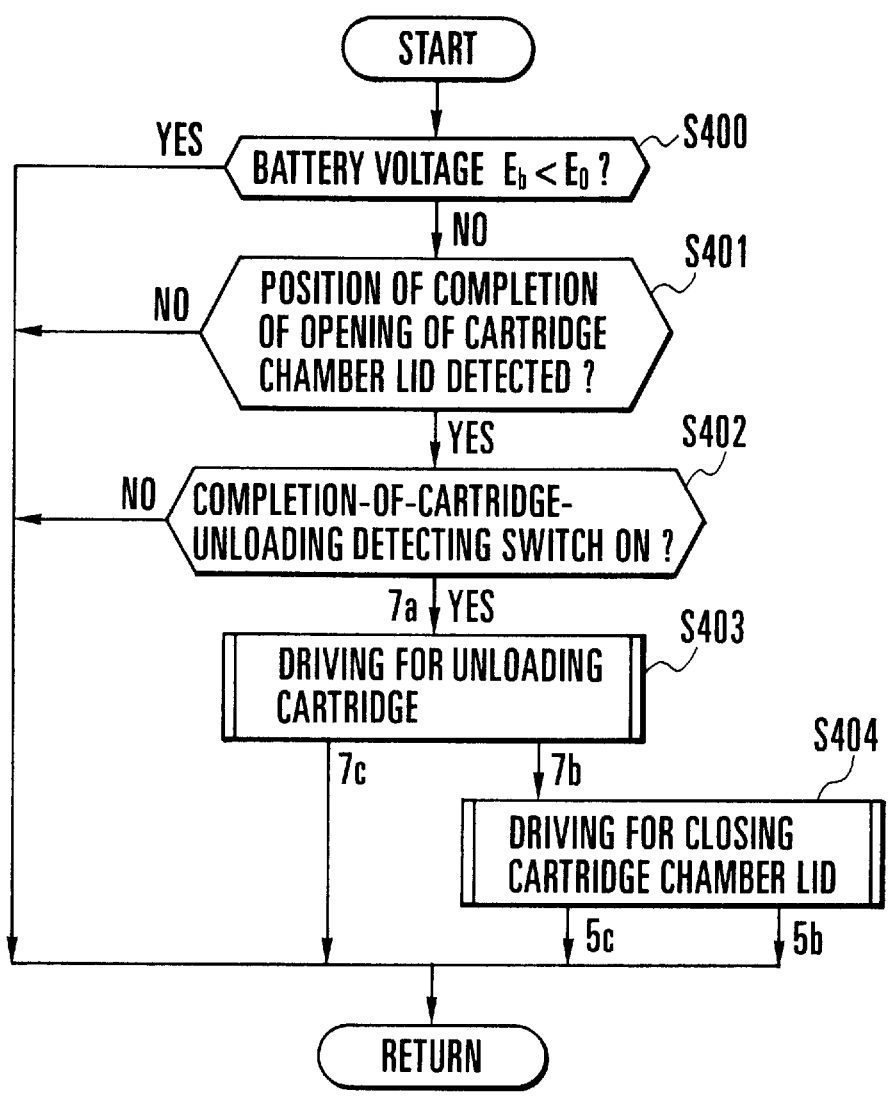
FIG. 6 is a flowchart showing a cartridge unloading subroutine of the camera of FIG. 1.

FIG. 6 shows the cartridge unloading subroutine shown in Step S115 of FIG. 3. This subroutine is executed when the cartridge ejecting switch 21 is pressed for the purpose of moving the cartridge 17 from its cartridge loading position to a cartridge unloading position at which the user can remove the cartridge 17 by hand.

First, since it is necessary to prevent the cartridge chamber lid 2 from stopping halfway owing to a decrease in the voltage of the battery 29, it is determined in Step S400 through the battery voltage detecting circuit 28 whether the voltage $E_b$ of the battery 29 is greater than the predetermined voltage $E_0$ which suffices to drive each of the circuits. If the voltage $E_b$ is smaller than the predetermined voltage $E_0$, the process terminates this subroutine and returns to Step S102 of FIG. 3. If the voltage $E_b$ is greater than the predetermined voltage $E_0$, whether the cartridge chamber lid 2 hinders the unloading of the cartridge 17 is determined by determining through the position-of-cartridge-chamber-lid detecting circuit 35 whether the opening of the cartridge chamber lid 2 has been completed (S401). If the cartridge chamber lid 2 hinders the unloading of the cartridge 17, the microcomputer 19 terminates this subroutine and returns the process to Sep S102 of FIG. 3 (S401:YES). If the cartridge chamber lid 2 does not hinder the unloading of the cartridge 17 (S401:NO), it is determined whether the cartridge 17 is located at a position where it can be unloaded, through the completion-of-cartridge-unloading detecting switch 9b of the cartridge loading position detecting circuit 37 (S402). If the cartridge 17 is already located at the unloading completion position, the microcomputer 19 terminates this subroutine and returns the process to Step S102 of FIG. 3 (S402:NO). If the cartridge 17 can be unloaded (S402:YES), the process proceeds to a subroutine (to be described later) for executing driving for unloading the cartridge 17 and executes the driving for unloading the cartridge 17 from the cartridge chamber 18 (S403). If the unloading of the cartridge 17 stops in an incomplete state (S403:7c), the microcomputer 19 terminates this subroutine and returns the process to Step S102 of FIG. 3. If the unloading of the cartridge 17 is completed, the process proceeds to the subroutine (to be described later) for executing driving for closing the cartridge chamber lid 2 and executes the driving for closing the cartridge chamber lid 2, in order to prevent the cartridge chamber 18 from remaining open (S404). If the driving for closing the cartridge chamber lid 2 is completed in Step S404, the process leaves Step S404 and proceeds along the line 5b, whereas if such driving is incomplete in Step S404, the process leaves Step S404 and proceeds along the line 5c. In either case, the microcomputer 19 terminates this subroutine and returns the process to Step S102 of FIG. 3.

Figure 7:
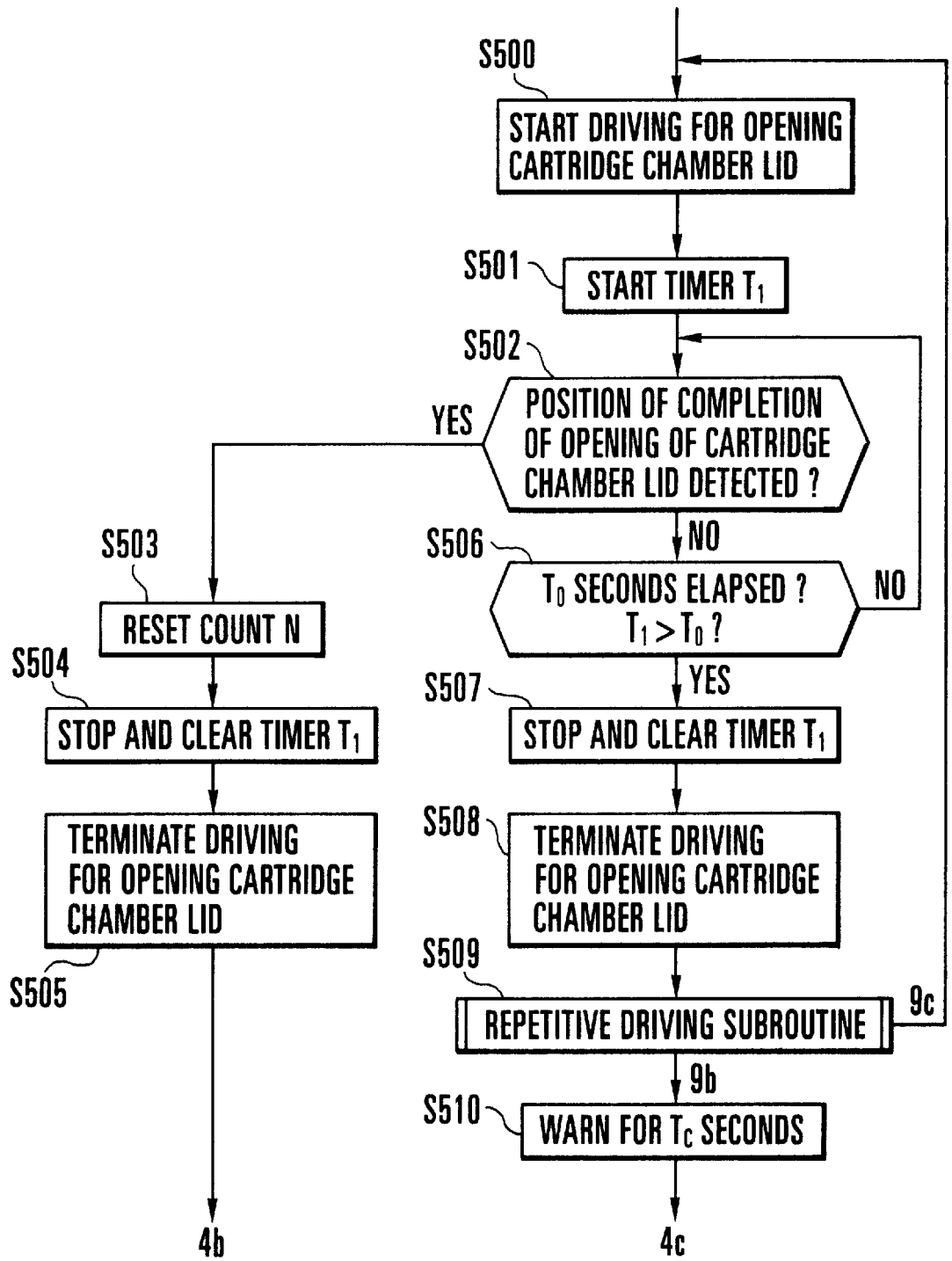
FIG. 7 is a flowchart showing a subroutine for executing driving for opening a cartridge chamber lid of the camera of FIG. 1.

The following is a specific description of the respective subroutines shown in FIGS. 4, 5 and 6, i.e., the subroutine for executing driving for opening the cartridge chamber lid 2, the subroutine for executing driving for closing the cartridge chamber lid 2, the subroutine for executing driving for loading the cartridge 17 and the subroutine for executing driving for unloading the cartridge 17, as well as a subroutine for executing repetitive driving in the case of an incomplete operation. FIG. 7 shows the subroutine for executing driving for opening the cartridge chamber lid 2, which is shown in Steps S202 and S209 of FIG. 4 and S305 of FIG. 5. First, the microcomputer 19 causes the film transporting circuit 33 to drive the motor 4 for driving the cartridge chamber lid 2 (S500). Then, the timer $T_1$ provided in the microcomputer 19 is started (S501) for measuring a sufficient time of $T_0$ seconds to move the cartridge chamber lid 2 without any trouble from a preset, closing completion position of the cartridge chamber lid 2 to a preset, opening completion position of the cartridge chamber lid 2. If the completion of opening of the cartridge chamber lid 2 is not detected within such $T_0$ seconds by the position-of-cartridge-chamber-lid detecting circuit 35, it can be determined that the cartridge chamber lid 2 has not yet moved owing to some trouble. Accordingly, the timer $T_1$ can also serve as trouble detecting means. The completion of opening of the cartridge chamber lid 2 is repeatedly performed (S502) until the elapsed time of the timer $T_1$ reaches $T_0$ seconds (S506). If the opening of the cartridge chamber lid 2 is completed within $T_0$ seconds (S502:YES), the microcomputer 19 resets a count N of a repetitive driving subroutine of Step S408 which will be described later (S503), resets the timer $T_1$ (S504), stops the driving for opening the cartridge chamber lid 2 (S505), and leaves this subroutine (4b).

If the completion of opening of the cartridge chamber lid 2 is not detected within $T_0$ seconds (S506), the microcomputer 19 resets the timer $T_1$ (S507), temporarily stops the driving for opening the cartridge chamber lid 2 (S508), and again performs the repetitive driving subroutine (to be described later) for performing driving for opening the cartridge chamber lid 2 (S509). This repetitive driving subroutine is performed a predetermined number of times (S509:9c), and if the cartridge chamber lid 2 is still not completely opened (S509:9b), the microcomputer 19 causes the warning circuit 40 to warn the use927 r for $T_C$ seconds that the opening of the cartridge chamber lid 2 has not been completed, by using sound, visual display using a liquid-crystal display, or blinking of light (S510). Then, the process leaves this subroutine (4c). Incidentally, if the opening of the cartridge chamber lid 2 is completed in the repetitive driving subroutine (from S509:9c to S502:YES), the process proceeds along the line 4b similarly to the above-described case.

Figure 8:
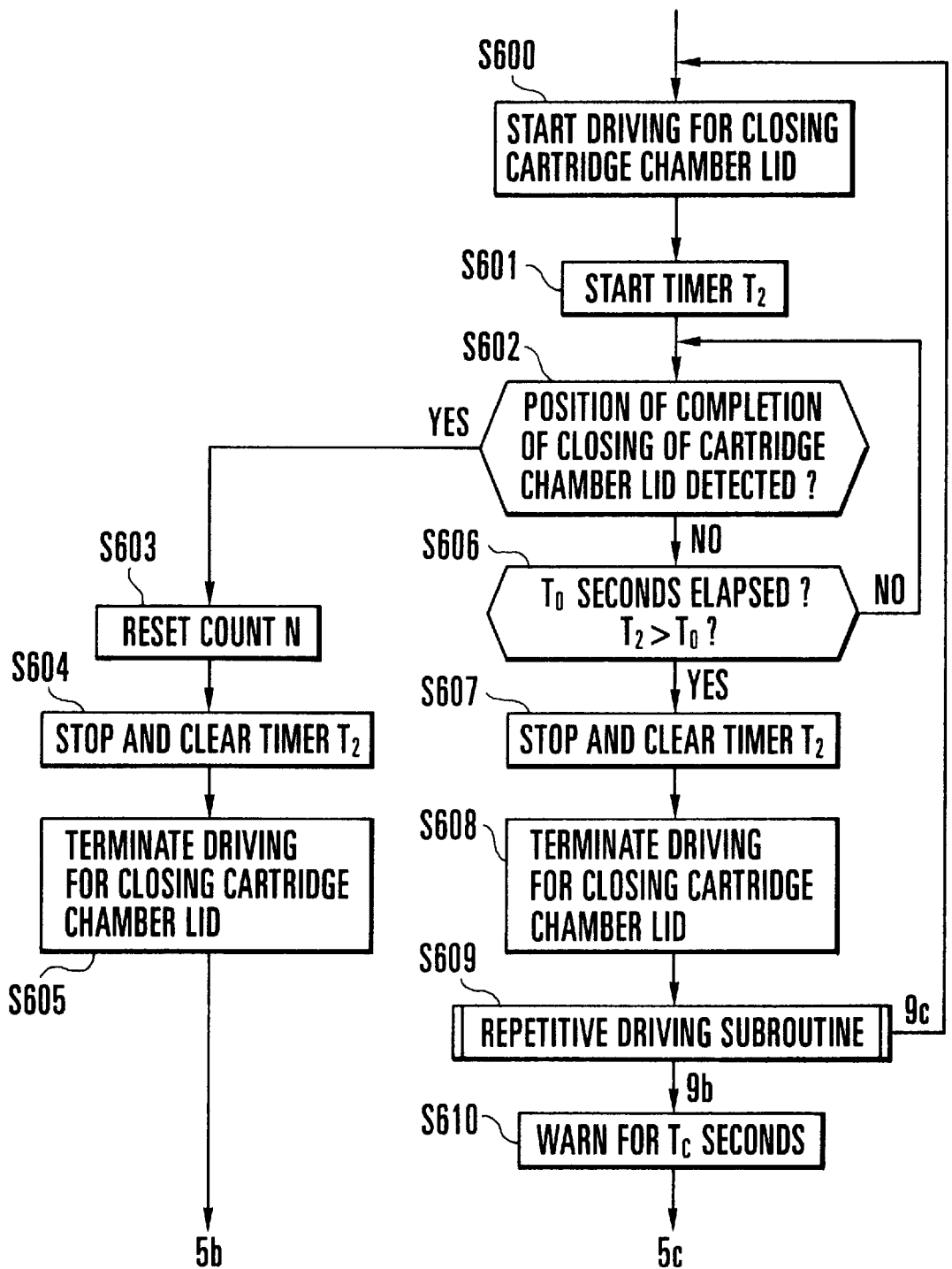
FIG. 8 is a flowchart showing a subroutine for executing driving for closing the cartridge chamber lid of the camera of FIG. 1.

FIG. 8 shows the subroutine for executing driving for closing the cartridge chamber lid 2 which is shown in Steps S204, S205 and S216 of FIG. 4 as well as Step S301 of FIG. 5. First, the microcomputer 19 causes the film transporting circuit 33 to start driving the motor 4 for driving the cartridge chamber lid 2 (S600). Then, a timer $T_2$ provided in the microcomputer 19 is started (S601) for measuring a sufficient time of $T_0$ seconds to move the cartridge chamber lid 2 without any trouble from a preset, opening completion position of the cartridge chamber lid 2 to a preset, closing completion position of the cartridge chamber lid 2. If the completion of closing of the cartridge chamber lid 2 is not detected within such $T_0$ seconds by the position-of-cartridge-chamber-lid detecting circuit 35, it can be determined that the cartridge chamber lid 2 has not yet moved owing to some trouble, for example, the cartridge chamber lid 2 being hindered by foreign matter, such as a finger accidentally inserted into the cartridge inserting opening. Accordingly, the timer $T_2$ can also serve as means for detecting whether foreign matter is inserted in the cartridge chamber 18. The completion of closing of the cartridge chamber lid 2 is repeatedly performed (S602) until the elapsed time of the timer $T_2$ reaches $T_0$ seconds (S606). If the closing of the cartridge chamber lid 2 is completed within $T_0$ seconds (S602:YES), the microcomputer 19 resets the count N of the repetitive driving subroutine of Step S509 which will be described later (S603), resets the timer $T_2$ (S604), stops the driving for closing the cartridge chamber lid 2 (S605), and leaves this subroutine (5b).

If the completion of closing of the cartridge chamber lid 2 is not detected within $T_0$ seconds (S606), the microcomputer 19 resets the timer $T_2$ (S607), temporarily stops the driving for closing the cartridge chamber lid 2 (S608), and again performs the repetitive driving subroutine (to be described later) for performing driving for closing the cartridge chamber lid 2 (S609:9a). This repetitive driving subroutine is performed a predetermined number of times (S609:9c), and if the cartridge chamber lid 2 is still not completely closed (S609:9b), the microcomputer 19 causes the warning circuit 40 to warn the user for $T_C$ seconds that the closing of the cartridge chamber lid 2 has not been completed, by using sound, visual display using a liquid-crystal display, or blinking of light (S610). Then, the process leaves this subroutine (5c). Incidentally, if the closing of the cartridge chamber lid 2 is completed in the repetitive driving subroutine (from S609:9c to S602:YES), the process proceeds along the line 5b similarly to the above-described case.

Figure 9:
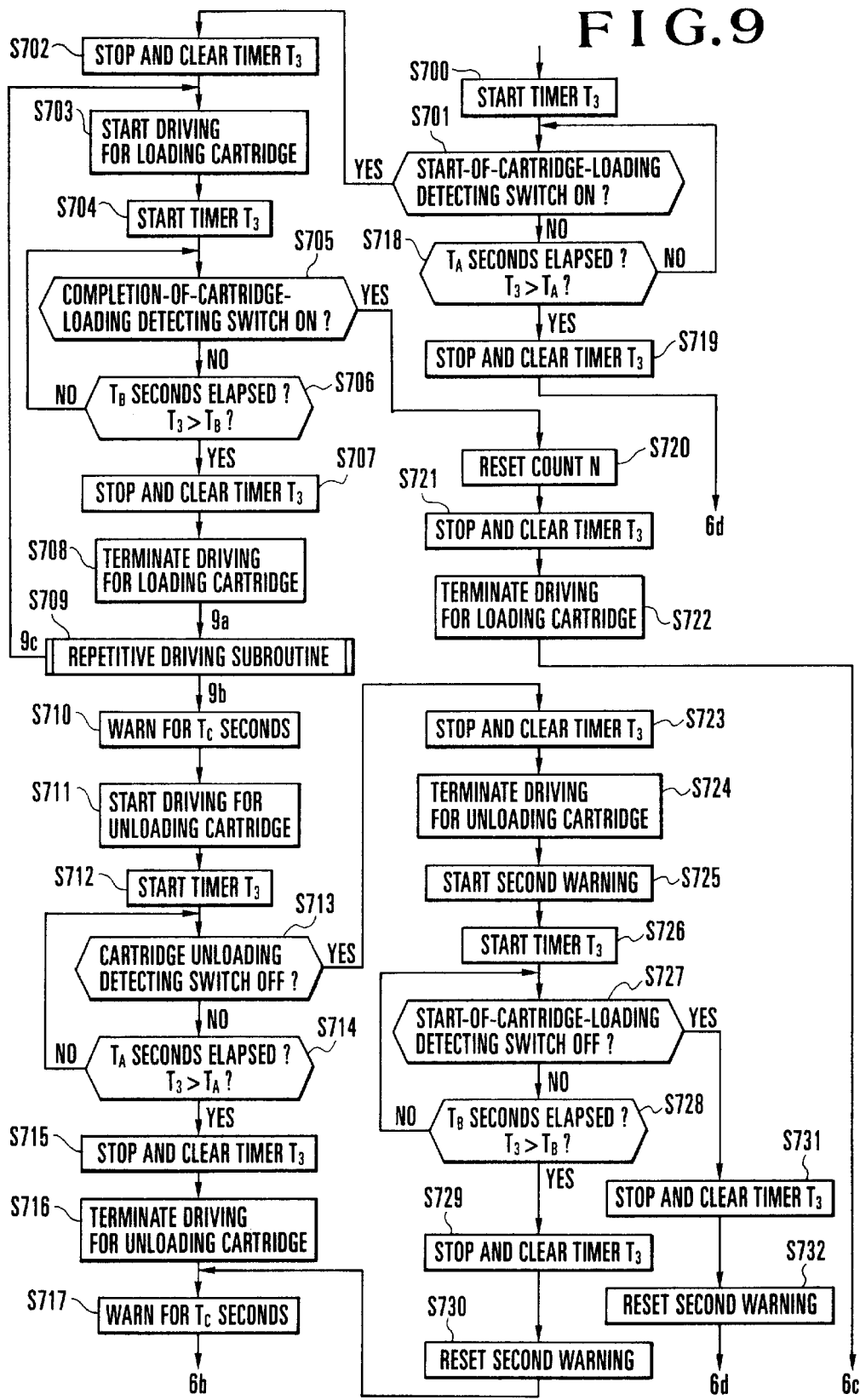
FIG. 9 is a flowchart showing a cartridge loading driving subroutine of the camera of FIG. 1.

FIG. 9 shows the cartridge-loading driving subroutine shown in Step S203 of FIG. 4. First, a timer $T_3$ provided in the microcomputer 19 is started for measuring a maximum wait time $T_A$ during which the microcomputer 19 can wait for the cartridge 17 to be loaded into the cartridge chamber 18 (S700). If insertion of the cartridge 17 into the cartridge chamber 18 is not detected within such $T_A$ seconds through the start-of-cartridge-loading detecting switch 9a of the cartridge loading position detecting circuit 37, it is determined that the user does not intend to load the cartridge 17 (S701:NO, S718:YES). The microcomputer 19 resets the timer $T_3$ (S719) and leaves this subroutine (6d). If insertion of the cartridge 17 into the cartridge chamber 18 is detected within $T_A$ seconds (S701:YES), the microcomputer 19 resets the timer $T_3$ (S702), causes the cartridge conveying circuit 36 to drive the cartridge conveying motor 8 for performing driving for loading the cartridge 17 (S703), thereby performing driving for loading the roller 6 for conveying the cartridge 17. At the same time, the timer $T_3$ provided in the microcomputer 19 is started for measuring a sufficient preset time $T_B$ for the cartridge 17 to be inserted and completely loaded (S704). Whether the loading of the cartridge 17 has been completed by the cartridge 17 being clamped between the rollers 6 and 7 and conveyed by the rotational force of the roller 6 is repeatedly detected within the cartridge-loading wait time $T_B$ by completion-of-cartridge-loading detecting switch 10 of the cartridge loading position detecting circuit 37 (S705). If the completion of loading of the cartridge 17 is detected within the time $T_B$ (S705:YES), the microcomputer 19 resets the count N of the repetitive driving subroutine of Step S709 which will be described later (S720), resets the timer $T_3$ (S721), terminates the cartridge loading driving (S722), and leaves this subroutine (6c).

If the loading of the cartridge 17 is not detected within the time $T_B$ (S706:YES), the microcomputer 19 resets the timer $T_3$ (S707), temporarily stops the cartridge loading driving (S708), and again performs the repetitive driving subroutine (to be described later) for performing driving for loading the cartridge 17 (S709). This repetitive driving subroutine is performed by a predetermined number of times (S709:9c), and if the loading of the cartridge 17 is still not completed (S709:9b), the microcomputer 19 causes the warning circuit 40 to warn the user for $T_C$ seconds that the loading of the cartridge 17 has not been completed, by using sound, visual display using a liquid-crystal display, or blinking of light (S710). Then, the microcomputer 19 causes the cartridge conveying circuit 36 to start driving for unloading from the cartridge chamber 18 the cartridge 17 which appears not to be completely loaded (S711).

If the loading of the cartridge 17 is completed in the repetitive driving subroutine (from S709:9c to S705:YES), the process proceeds along the line 6c similarly to the above-described case.

When the driving for unloading the cartridge 17 is started in Step S711, the timer $T_3$ provided in the microcomputer 19 is started (S712) for measuring a sufficient time of $T_A$ seconds to move the cartridge 17 without any trouble from its preset, cartridge loading completion position to a preset, cartridge unloading completion position. Whether the unloading of the cartridge 17 has been completed is repeatedly detected within $T_A$ seconds by the completion-of-cartridge-unloading detecting switch 9b of the position-of-cartridge-chamber-lid detecting circuit 35 (S713, S714:NO). If the completion of the unloading of the cartridge 17 is not detected within $T_A$ seconds (S714:YES), it is determined that it is impossible to load or unload the cartridge 17 which is incompletely loaded in the cartridge chamber 18. The microcomputer 19 immediately resets the timer $T_3$,(S715), stops the driving for unloading the cartridge 17 (S716), causes the warning circuit 40 to warn the user for $T_C$ seconds that the driving for loading the cartridge 17 has not been completed, by using sound, visual display; light or the like (S717). Then, the process leaves this subroutine (6b).

If the cartridge 17, after it is inserted and loaded, is sent back in an incompletely loaded state to a position at which the user can remove the cartridge 17 by hand (S713:YES), the microcomputer 19 resets the timer $T_3$ (S723), terminates the driving for unloading the cartridge 17 (S724), and causes the warning circuit 40 to issue a second warning different from the above-described one to inform the user that the cartridge 17 is located at the position where the cartridge 17 can be removed by hand, and request the user to remove the cartridge 17 (S725). For this purpose, the warning lamp 31 or the like is provided adjacently to the cartridge inserting opening of the cartridge chamber 18, as shown in FIG. 1 by way of example. Since the warning lamp 31 is visible even in the dark, the user can readily find the place where the cartridge 17 can be removed. When the second warning is started, the timer $T_3$ starts counting for measuring a preset, maximum wait time $T_B$ during which the microcomputer 19 can wait for the cartridge 17 to be removed from the cartridge chamber 18 by the user (S726). Whether the cartridge 17 has been removed is repeatedly detected by the completion-of-cartridge-unloading detecting switch 9b of the position-of-cartridge-chamber-lid detecting circuit 35 until the elapsed time of the timer $T_3$ reaches $T_B$ seconds (S727). If the removal of the cartridge 17 is detected (S727:YES), the microcomputer 19 resets the timer $T_3$ (S731), stops the second warning (S732), and leaves this subroutine with the cartridge chamber 18 being empty and open (6c). If the removal of the cartridge 17 is not detected (S728:YES), the microcomputer 19 resets the timer $T_3$ (S729), and causes the warning circuit 40 to warn the user for $T_C$ seconds by using sound, visual display, light or the like that the cartridge chamber lid 2 remains open with the cartridge 17 being removably inserted in the cartridge chamber 18 and the driving for loading the cartridge 17 has not been completed. Then, the process leaves this subroutine (6b).

Figure 10:
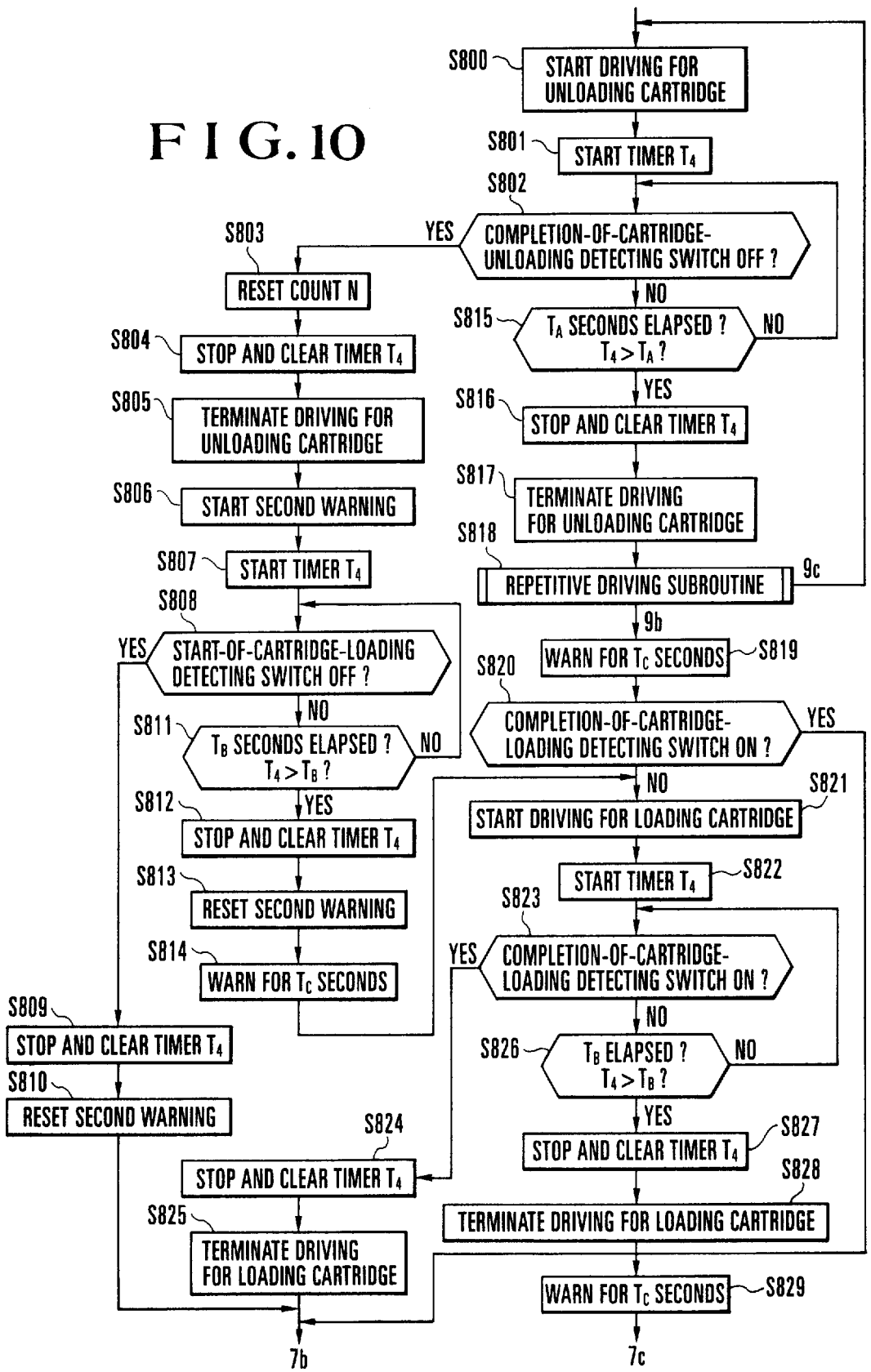
FIG. 10 is a flowchart showing a subroutine for executing driving for unloading the cartridge chamber lid of the camera of FIG. 1.

FIG. 10 shows the subroutine for executing driving for unloading the cartridge 17, which is shown in Step S215 of FIG. 4 and Step S403 of FIG. 6. First, the microcomputer 19 causes the cartridge conveying circuit 36 to start driving the cartridge conveying motor 8 to cause it to perform driving for unloading the cartridge 17 (S800), whereby the cartridge conveying motor 8 starts driving the cartridge conveying roller 6 for unloading the cartridge 17. At this time, a timer $T_4$ provided in the microcomputer 19 is started (S801) for measuring a sufficient time of $T_A$ seconds to move the cartridge 17 without any trouble from the preset, cartridge loading completion position to the preset, cartridge unloading completion position. Whether the unloading of the cartridge 17 has been completed is repeatedly detected by the completion-of-cartridge-unloading detecting switch 9b of the position-of-cartridge-chamber-lid detecting circuit 35

(S802) until the elapsed time of the timer $T_4$ reaches $T_A$ seconds (S816). If the completion of the unloading of the cartridge 17 is detected within $T_A$ seconds (S802:YES) (even if the cartridge 17 is not loaded), the microcomputer 19 resets the timer $T_4$ (S804), resets the count N of the repetitive driving subroutine of Step S818 which will be described later (S803), and terminates the driving for unloading the cartridge 17 (S805).

If the completion of the unloading of the cartridge 17 is not detected within $T_A$ seconds (S815:YES), the microcomputer 19 resets the timer $T_4$ (S816), temporarily stops the driving for unloading the cartridge 17 (S817), and causes the process to proceed to the repetitive driving subroutine (to be described later) for repeatedly performing the cartridge unloading operation (S818). The microcomputer 19 performs this repetitive driving subroutine by a predetermined number of times (S818:9c), and if the completion of the unloading of the cartridge 17 is detected (S802:YES), the process proceeds to the above-described step S804. If the repetitive driving subroutine is performed by the predetermined number of times but the completion of the unloading of the cartridge 17 is still not detected (S818:9b), the microcomputer 19 causes the warning circuit 40 to warn the user for $T_C$ seconds that the driving for loading the cartridge 17 has not been completed, by using sound, visual display, light or the like (S819). Then, whether the cartridge 17 has not moved at all or has been moved outward even by a small amount is detected by the completion-of-cartridge-loading detecting switch 10 of the cartridge loading position detecting circuit 37 (S820). If the cartridge 17 has not moved at all (S820:YES), the process leaves this subroutine (7b). If the cartridge 17 has moved outward even by a small amount (S820:NO), the cartridge loading operation is again performed by the cartridge conveying circuit 36 (S821).

If, in Step S805, the unloading of the cartridge 17 is completed and the driving for unloading the cartridge 17 is terminated, the microcomputer 19 causes the warning circuit 40 to issue the second warning different from the aforesaid one to inform the user that the cartridge 17 has been unloaded, as by turning on the warning lamp 31 or the like provided adjacently to the cartridge inserting opening of the cartridge chamber 18.

Then, the timer $T_4$ starts counting for measuring the preset, maximum wait time $T_B$ during which the microcomputer 19 can wait for the cartridge 17 to be removed from the cartridge chamber 18 by the user (S811). Whether the removal of the cartridge 17 has been completed is repeatedly detected by the completion-of-cartridge-unloading detecting switch 9b of the position-of-cartridge-chamber-lid detecting circuit 35 until the elapsed time of the timer $T_4$ reaches time $T_B$ (S808). If the completion of the removal of the cartridge 17 is detected within the predetermined time of $T_B$ seconds (S808:YES), the microcomputer 19 resets the timer $T_4$ (S809), stops the second warning (S810), and leaves this subroutine (7b).

If the completion of the removal of the cartridge 17 is not detected (S811:YES), the microcomputer 19 resets the timer $T_4$ (S812), stops the second warning (S813), and causes the warning circuit 40 to warn the user for $T_C$ seconds that the cartridge 17 remains inserted, by using sound, visual display, light or the like (S814). Then, microcomputer 19 starts the operation of again loading the inserted cartridge 17 into the camera. The cartridge conveying circuit 36 is made to start driving the cartridge conveying motor 8 for the purpose of performing driving for loading the cartridge 17 (S821), thereby driving the cartridge conveying roller 6 to load the cartridge 17. At this time, since the cartridge 17 is clamped between the rollers 6 and 7 whether the process executes Step S821 after Step S814 or after Step S820:NO, the cartridge 17 is immediately driven and loaded into the camera. At the same time, the timer $T_4$ starts counting for measuring the time $T_B$ which is sufficient for the cartridge 17 to be conveyed without any trouble from a preset, cartridge inserting position to the preset, cartridge loading completion position (S822). Whether the loading of the cartridge 17 has been completed is repeatedly detected within the predetermined time of $T_B$ seconds (S823) by the completion-of-cartridge-loading detecting switch 10 of the cartridge loading position detecting circuit 37 (S826). If the completion of the loading of the cartridge 17 is detected with the predetermined time of $T_B$ seconds (S823:YES), the microcomputer 19 resets the timer $T_4$, terminates the driving for loading the cartridge 17 (S825), and leaves this subroutine (7b).

If the completion of the unloading of the cartridge 17 is not detected within $T_B$ seconds (S826:YES), the microcomputer 19 resets the timer $T_4$ (S827), immediately stops the driving for loading the cartridge 17 (S828), causes the warning circuit 40 to warn the user for $T_C$ seconds that the driving for loading the cartridge 17 has not been completed, by using sound, visual display, light or the like (S829). Then, the process leaves this subroutine (7c).

Figure 11:
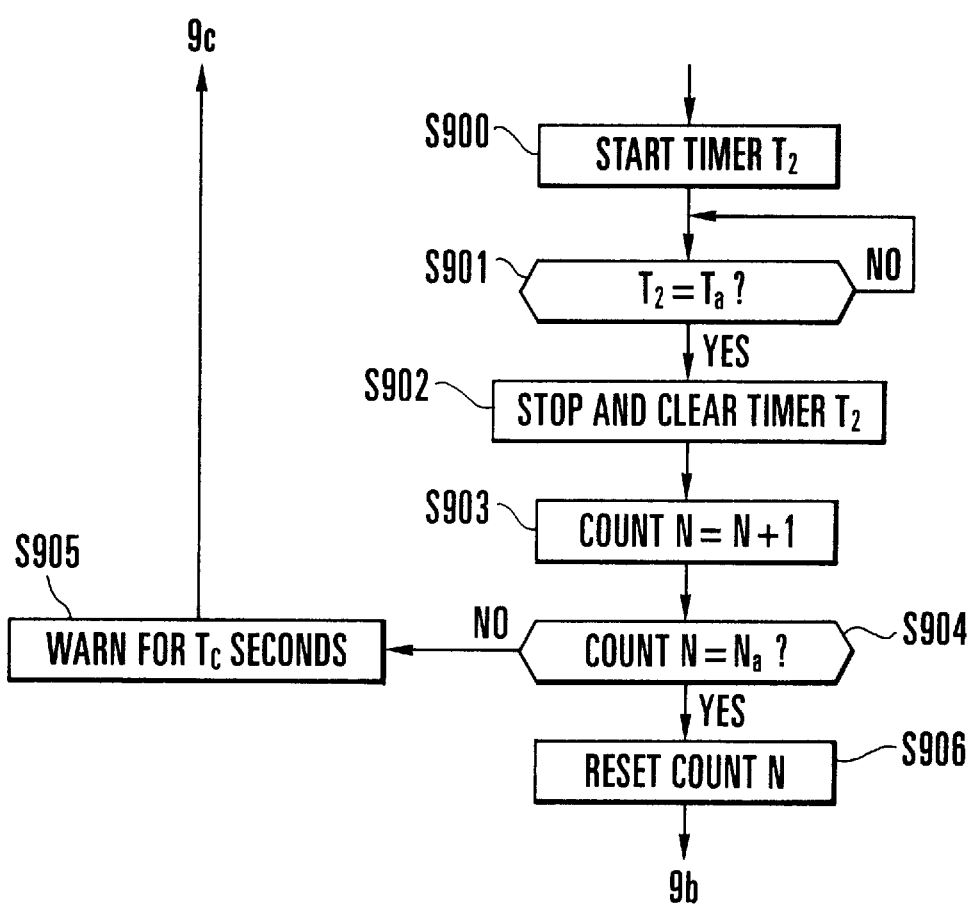
FIG. 11 is a flowchart showing a repetitive driving subroutine of the camera of FIG. 1.

FIG. 11 shows a subroutine for performing the repetitive driving shown in Step S509 of FIG. 7, Step S609 of FIG. 8, Step S709 of FIG. 9 and Step S818 of FIG. 10. This repetitive driving is set so that, if the driving for opening or closing the cartridge chamber lid 2 or the driving for loading or unloading the cartridge 17 comes to an incomplete end, the same operation can be automatically retried. For this reason, the repetitive driving is positioned as a step to be executed after the first desired driving has come to an incomplete end. In this subroutine, after the desired driving has been incompletely terminated, the same driving is retried. To realize this operation, after the desired driving has been stopped, the timer $T_2$ is started (S900) and the desired driving is stopped for a preset stop time of $T_a$ seconds. If the timer $T_2$ counts the preset stop time of $T_a$ seconds (S901), the microcomputer 19 resets the timer $T_2$ (S902) and starts counting the number of times of repetitions, N, (S903). Subsequently, the microcomputer 19 executes the loop of repeating the same driving until the number of times of repetitions, N, reaches a preset number of times, Na (S904:NO).

Then, the microcomputer 19 causes the warning circuit 40 to warn the user for $T_C$ seconds that the first desired driving has been incomplete, by using sound, visual display or light (S905). Then, the process leaves this subroutine (9c). Incidentally, if the desired driving is not completed until the number of times of repetitions, N, reaches the predetermined number of times, Na, (S904:YES), the process resets the count N and leaves this subroutine (9b).

It is to be noted that if a sequence which does not need this repetitive operation is to be adopted, the subroutine shown in FIG. 11 may be omitted. In addition, if the number of times of repetitions, Na, is set to Na=1, the process can proceed to the next sequence without entering the repetition loop (S904:NO).

It is also to be noted that, in the present embodiment, the location of a particular step which is being executed in the sequence shown in FIGS. 3 to 11 or the location of a termination step at which the sequence is terminated is repeatedly restored in the EEPROM 20b in the microcomputer 19 by rewriting the information of the EEPROM 20b at all times. Accordingly, even if the circuit stops owing to a decrease in the voltage of the battery 29 while the sequence shown in FIGS. 3 to 11 is being executed, it is possible to read the stored information of the EEPROM 20b when the required level of voltage is again supplied, so that the operation of the circuit can be started from a sequence step based on the read information of the EEPROM 20b.

Figure 12:
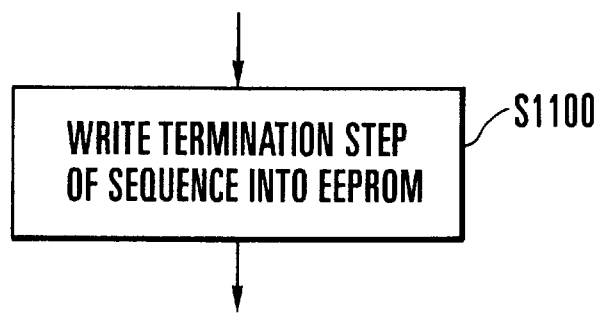
FIG. 12 is a flowchart showing a sequence of the camera of FIG. 1, for storing the location of a termination step.

FIG. 12 shows a step for repeatedly restoring the location of a step which is being executed in the sequence shown in FIGS. 3 to 11 into the EEPROM 20b of the microcomputer 19 by writing the stored information of the EEPROM 20b at all times. When the sequence shown in FIGS. 3 to 11 is terminated at a particular step, the location of the particular step is rewritten and stored into the EEPROM 20b (S1100).

Figure 13:
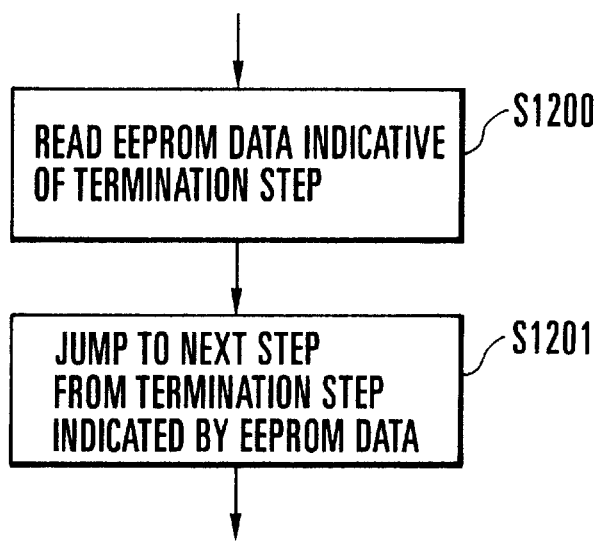
FIG. 13 is a flowchart showing a sequence of the camera of FIG. 1, for searching for the location of a termination step.
Figure 14A:
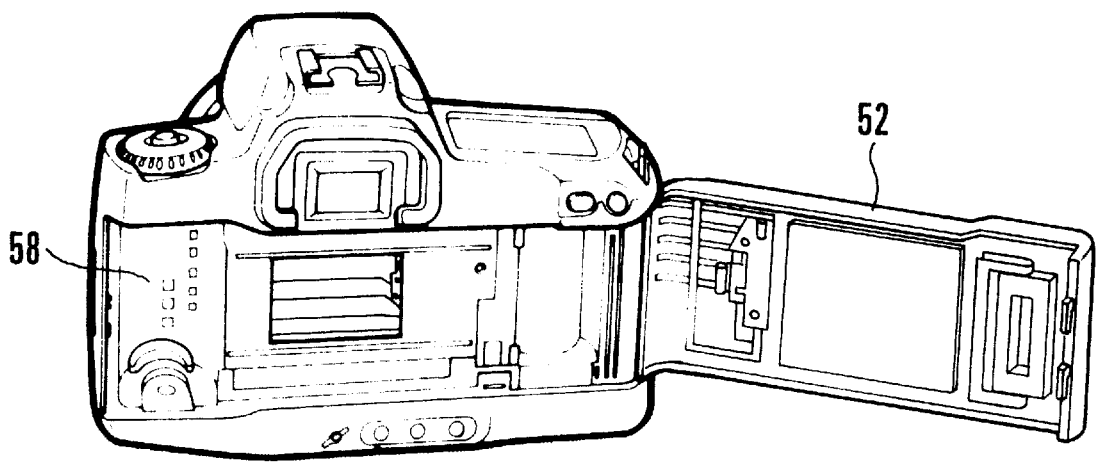
FIG. 14a and 14b are views showing a conventional loading method for a film cartridge.
Figure 14B:
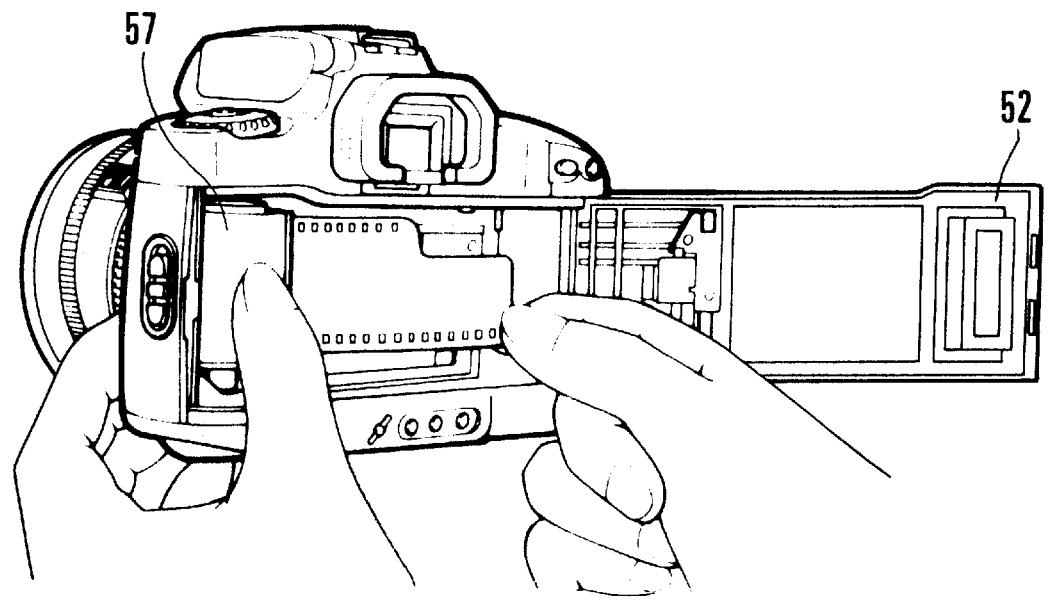

FIG. 13 shows a processing step for reading the stored location of the particular step from the EEPROM 20b of the microcomputer 19 when the power of the camera is turned on to restart the camera, and starting an operation at a step which immediately follows the read location of the particular step. When the power of the camera is turned on to restart the camera, the microcomputer 19 reads the stored location of a termination step from the EEPROM 20b, and starts the operation at a step which immediately follows the read location of the termination step.

According to the above-described arrangement, when the power of the camera is turned on to restart the camera, it is possible to start an operation which was being carried out at the time of an interruption, without executing an unnecessary step.

It is also to be noted that the step of writing such a termination step into the EEPROM 20b may be inserted between desired steps of the sequence shown in FIGS. 3 to 11. If such writing step is inserted between each step and the next step, when an old power source is replaced with a new power source and the camera is restarted, it is possible to directly start a step which was being carried out at the time of an interruption or a step which was carried out immediately before the interruption. Accordingly, it is possible to restore the operation in a far shorter time.

As is apparent from the foregoing description, during the operation shown in FIGS. 4 to 11 for loading or unloading the cartridge 17, other operations are not performed, such as a flash-unit charging operation, a film transporting operation such as winding and rewinding of film, a focal length varying operation, a focus adjusting operation, a photographing operation and the like. Accordingly, it is possible to prevent a power source which is used for loading or unloading the cartridge 17 from being simultaneously used for such other operations. Therefore, the operation for loading or unloading the cartridge 17 can be appropriately performed without causing a decrease in the voltage of the power source.

It is also to be noted that the present invention can be applied to various kinds of usable power sources, for example, all kinds of batteries, such as dry batteries, rechargeable batteries and solar batteries, and energy sources other than the batteries.

The present invention is not limited to the arrangement in which a cartridge is inserted from below the camera as described above in connection with the embodiments. For example, the present invention can be applied to an arrangement in which a cartridge is inserted from above the camera or from either side thereof.

The present invention is not limited to the arrangement in which the cartridge is inserted in the axial direction thereof as described above in the aforesaid embodiments.

The present invention can also be applied to various image recording media other than film.

The present invention can also be applied to a cartridge of any type other than the one referred to in the description of the preferred embodiments, a cartridge having an image recording medium other than film, any other kind of cartridge and a battery or a similar loading subject other than such a cartridge.

Further, the present invention can be applied to an arrangement using a nonvolatile memory other than the EEPROM referred to in the description of the preferred embodiments.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The individual components shown in schematic or block form in the drawings are all well-known in the camera arts and their specific construction and operation are not critical to the operation or best mode for carrying out the invention.

The present invention can also be practised by combining the above-described embodiments or technical elements thereof with each other, as required.

The present invention can be applied to other kinds of arrangements. For example, the whole or part of the arrangement set forth herein or in the appended claims may constitute one apparatus, or may be connected to other apparatus, or may constitute an element which forms part of another apparatus.

The present invention can also be applied to various types of cameras such as a single-lens reflex camera, a lens shutter camera or a video camera, optical or other apparatuses other than the cameras, apparatuses applicable to the cameras or the optical or other apparatuses, or elements which constitute part of such apparatuses.

What is claimed is:

1. Apparatus adapted to an image recording medium cartridge having a cartridge cover which allows entrance or exit of an image recording medium into or from the image recording medium cartridge, comprising:

(A) a first driving device which drives the cartridge cover;

(B) a second driving device which performs a driving operation of at least one of loading and unloading the image recording medium cartridge into and from a cartridge chamber, said second driving device being adapted to use the same energy source as said first driving device; and (C) a control device which prevents said first and second driving devices from operating simultaneously.

2. Apparatus according to claim 1, wherein the cartridge cover allows entrance or exit of a leading edge of the image recording medium into or from the image recording medium cartridge.

3. Apparatus according to claim 1, wherein the image recording medium comprises a film.

4. Apparatus according to claim 1, wherein the cartridge cover comprises a structure for shielding the image recording medium in the cartridge from light.

5. Apparatus according to claim 1, wherein said second driving device comprises a moving device which moves the image recording medium cartridge.

6. Apparatus according to claim 1, wherein said apparatus comprises a camera.

7. Apparatus according to claim 1, wherein the energy source comprises a battery.

8. Apparatus according to claim 1, wherein said first driving device comprises an electrically powered driving device.

9. Apparatus according to claim 8, wherein said second driving device comprises an electrically powered driving device.

10. Apparatus according to claim 1, wherein said second driving device comprises an electrically powered driving device.

11. Apparatus adapted to an image recording medium cartridge having a cartridge cover which allows entrance or exit of an image recording medium into or from the image recording medium cartridge, comprising:

(A) a first driving device which drives a cartridge chamber cover for opening and closing a cartridge chamber;

(B) a second driving device which performs a driving operation of at least one of loading and unloading the image recording medium cartridge into and from a cartridge chamber, said second driving device being adapted to use the same energy source as said first driving device; and (C) a control device which prevents said first and second driving devices from operating simultaneously.

12. Apparatus according to claim 11, wherein the cartridge cover allows entrance or exit of a leading edge of the image recording medium into or from the image recording medium cartridge.

13. Apparatus according to claim 11, wherein the image recording medium comprises a film.

14. Apparatus according to claim 11, wherein the cartridge cover comprises a structure for shielding the image recording medium in the cartridge from light.

15. Apparatus according to claim 11, wherein said second driving device comprises a moving device which moves the image recording medium cartridge.

16. Apparatus according to claim 11, wherein said apparatus comprises a camera.

17. Apparatus according to claim 11, wherein the energy source comprises a battery.

18. Apparatus according to claim 11, wherein said first driving device comprises an electrically powered driving device.

19. Apparatus according to claim 18, wherein said second driving device comprises an electrically powered driving device.

20. Apparatus according to claim 11, wherein said second driving device comprises an electrically powered driving device.

21. Apparatus adapted to an image recording medium cartridge having a cartridge cover which allows entrance or exit of an image recording medium into or from the image recording medium cartridge, comprising:

(A) a first driving device which drives the cartridge cover;

(B) a second driving device which drives a cartridge chamber cover for opening and closing a cartridge chamber, said second driving device being adapted to use the same energy source as said first driving device; and (C) a control device which prevents said first and second driving devices from operating simultaneously.

22. Apparatus according to claim 21, wherein the cartridge cover allows entrance or exit of a leading edge of the image recording medium into or from the image recording medium cartridge.

23. Apparatus according to claim 21, wherein the image recording medium comprises a film.

24. Apparatus according to claim 21, wherein the cartridge cover comprises a structure for shielding the image recording medium from light.

25. Apparatus according to claim 21, wherein said apparatus comprises a camera.

26. Apparatus according to claim 21, wherein the energy source comprises a battery.

27. Apparatus according to claim 21, wherein said first driving device comprises an electrically powered driving device.

28. Apparatus according to claim 27, wherein said second driving device comprises an electrically powered driving device.

29. Apparatus according to claim 21, wherein said second driving device comprises an electrically powered driving device.

* * * * *

UNITED STATES PATENT AND TRADEMARK OFFICE
CERTIFICATE OF CORRECTION

PATENT NO. : 5,812,896
DATED : September 22, 1998
INVENTOR(S) : Ryoji Okuno, et al It is certified that error appears in the above-identified patent and that said Letters Patent is hereby corrected as shown below:

Column 12, line 19, "use927 r" should read --user--.

Signed and Sealed this

Sixth Day of April, 1999

Attest:

Q. TODD DICKINSON

Attesting Officer

Acting Commissioner of Patents and Trademarks